(12) United States Patent
Okabe et al.

(10) Patent No.: US 11,010,914 B2
(45) Date of Patent: May 18, 2021

(54) IMAGE PROCESSING DEVICE, MICROSCOPE SYSTEM, IMAGE PROCESSING METHOD, AND PROGRAM

(71) Applicant: NIKON CORPORATION, Tokyo (JP)

(72) Inventors: Toshiya Okabe, Yokohama (JP); Ichiro Sase, Yokohama (JP); Ryosuke Komatsu, Yokohama (JP); Yutaka Sasaki, Yokohama (JP); Miroslav Svoboda, Jílové u Prahy (CZ); Martin Sajdl, Neveklov (CZ); Jiri Sonsky, Celákovice (CZ)

(73) Assignee: NIKON CORPORATION, Tokyo (JP)

( * ) Notice: Subject to any disclaimer, the term of this patent is extended or adjusted under 35 U.S.C. 154(b) by 173 days.

(21) Appl. No.: 16/463,864

(22) PCT Filed: Nov. 24, 2016

(86) PCT No.: PCT/JP2016/084866
§ 371 (c)(1),
(2) Date: May 24, 2019

(87) PCT Pub. No.: WO2018/096639
PCT Pub. Date: May 31, 2018

(65) Prior Publication Data
US 2020/0074669 A1 Mar. 5, 2020

(51) Int. Cl.
*G06T 7/70* (2017.01)
*G06T 3/20* (2006.01)
(Continued)

(52) U.S. Cl.
CPC .............. *G06T 7/70* (2017.01); *G06T 3/20* (2013.01); *G06T 3/40* (2013.01); *G06T 3/60* (2013.01);
(Continued)

(58) Field of Classification Search
CPC .... G06T 7/70; G06T 3/20; G06T 3/40; G06T 3/60; G06T 2207/10056;
(Continued)

(56) References Cited

U.S. PATENT DOCUMENTS

2005/0139748 A1 6/2005 Kitahara
2012/0104250 A1* 5/2012 Bean ................ H01J 37/26
250/307

(Continued)

FOREIGN PATENT DOCUMENTS

CN 105030265 A 11/2015
JP 2005-148584 A 6/2005

(Continued)

OTHER PUBLICATIONS

Feb. 14, 2017 International Search Report issued in International Patent Application No. PCT/JP2016/084866.

(Continued)

*Primary Examiner* — Phuoc Tran
(74) *Attorney, Agent, or Firm* — Oliff PLC

(57) ABSTRACT

An image processor includes an accepting unit that accepts designation of at least part of a three dimensional microscope image data, and an image generator that generates three dimensional magnified image data based on the designation. In the image processor, the image generator may sequentially output a first magnified image based on at least part of data of the three dimensional magnified image data, and a second magnified image based on the at least part of data of the three dimensional magnified image data which has at least part of data different from the first magnified image.

37 Claims, 18 Drawing Sheets

(51) Int. Cl.
*G06T 3/40* (2006.01)
*G06T 3/60* (2006.01)

(52) U.S. Cl.
CPC .............. *G06T 2207/10056* (2013.01); *G06T 2207/20212* (2013.01)

(58) Field of Classification Search
CPC ... G06T 2207/20212; G06T 1/00; H04N 7/18; G02B 21/00
See application file for complete search history.

(56) References Cited

U.S. PATENT DOCUMENTS

| | | |
|---|---|---|
| 2012/0249549 A1 | 10/2012 | Endo et al. |
| 2014/0126789 A1 | 5/2014 | Ban et al. |
| 2014/0184778 A1* | 7/2014 | Takayama ............ G02B 21/367 348/79 |
| 2015/0185463 A1 | 7/2015 | Ohki et al. |
| 2015/0310610 A1 | 10/2015 | Ishihara et al. |
| 2017/0332065 A1* | 11/2017 | Regensburger ...... G02B 21/367 |

FOREIGN PATENT DOCUMENTS

| | | |
|---|---|---|
| JP | 2006-049155 A | 2/2006 |
| JP | 2008-093254 A | 4/2008 |
| JP | 2011-125568 A | 6/2011 |
| JP | 2011-142974 A | 7/2011 |
| JP | 2015-208539 A | 11/2015 |
| WO | 2012/169344 A1 | 12/2012 |
| WO | 2014/013720 A1 | 1/2014 |

OTHER PUBLICATIONS

Feb. 14, 2017 Written Opinion of the International Searching Authority issued in International Patent Application No. PCT/JP2016/084866.

Sep. 3, 2020 Office Action issued in Chinese Patent Application No. 201680091040.9.

May 20, 2020 Extended European Search Report issued in European Patent Application No. 16922420.1.

* cited by examiner

IMAGE PROCESSING DEVICE, MICROSCOPE SYSTEM, IMAGE PROCESSING METHOD, AND PROGRAM

CROSS-REFERENCE

This application is a U.S. national phase entry of International Application No. PCT/JP2016/084866 which was filed on Nov. 24, 2016, and the disclosure of international application no. PCT/JP2016/084866 is incorporated herein by reference in their entirety.

TECHNICAL FIELD

The present disclosure relates to an image processor, a microscope system, an image processing method, and a program stored in a non-transitory computer readable medium.

BACKGROUND ART

There is a technique of magnifying and displaying part of a CT image (for example, see JP 2015-208539 A). It has been difficult to compare and observe a plurality of microscope images.

SUMMARY

In a first aspect of the present disclosure, an image processor includes an accepting unit configured to accept designation in at least part of a first microscope image, and an image generator configured to generate image data for displaying, on a display, a first magnified image in which a first region in the at least part of the first microscope image is magnified based on the designation, a second magnified image in which a second region of a second microscope image related to the first region in the at least part of the first microscope image is magnified, the first microscope image and the second microscope image.

In a second aspect of the present disclosure, an image processing method includes accepting designation in at least part of a first microscope image, and generating image data for displaying, on a display, a first magnified image in which a first region in the at least part of the first microscope image is magnified based on the designation, a second magnified image in which a second range of a second microscope image related to the first region in the at least part of the first microscope image is magnified, the first microscope image and the second microscope image.

In a third aspect of the present disclosure, a non-transitory computer readable medium storing computer program that causes a computer to perform accepting designation in at least part of a first microscope image, and generating image data for displaying, on a display, a first magnified image in which a first region in the at least part of the first microscope image is magnified based on the designation, a second magnified image in which a second region of a second microscope image related to the first region in the at least part of the first microscope image is magnified, the first microscope image and the second microscope image.

The aforementioned summary of the present disclosure does not list all features of the present disclosure. The present disclosure may also be a sub-combination of these features.

DESCRIPTION OF EMBODIMENTS

Hereinafter, the present disclosure will be described through embodiments of the disclosure. The following embodiments do not limit the disclosure according to the claims. Not all of combinations of the features described in the embodiments are necessarily essential to the solving means of the disclosure.

Figure 1:
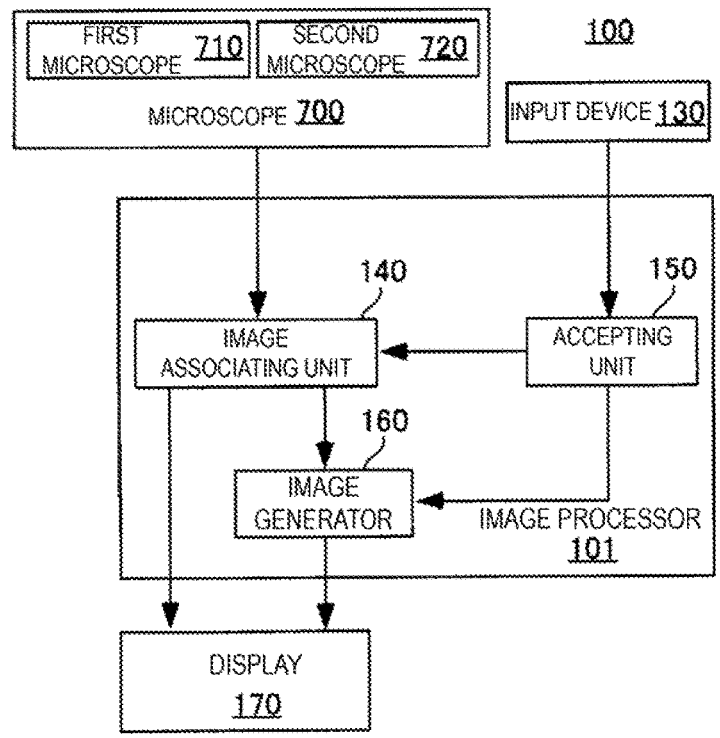
FIG. 1 is a block diagram of a microscope system 100.

FIG. 1 is a block diagram of a microscope system 100 including an image processor 101. The microscope system 100 includes a microscope 700, an input device 130, the image processor 101, and a display 170.

The input device 130 is operated in a case where an instruction from a user is input to the image processor 101. As the input device 130, an existing general-purpose input device such as a pointing device such as a mouse, a keyboard, or a touch panel may be used. Although the input device 130 is for input to the image processor 101, it may also be provided for operating a first microscope 110 and a second microscope 120.

The display 170 is a liquid crystal display panel or the like, and displays a display image output by the image processor 101 in a state that the user can visually recognize. The display 170 may also be provided for the first microscope 110, the second microscope 120, and the like for the purpose of displaying an image.

The image processor 101 includes an image associating unit 140, an accepting unit 150, and an image generator 160, The image processor 101 is configured by a general-purpose information processing device controlled by a program for performing image processing described below. The image processor 101 processes microscope image data acquired from the microscope 700 and generates an image to be displayed on the display 170.

The microscope 700 includes a first microscope 710 and a second microscope 720 that capture images of a specimen based on mutually different microscopies. The first microscope 710 and the second microscope 720 share at least part of optical systems in both microscopes (that is, at least part of optical axes in both microscopes are coaxial). Note that, the optical systems in both the first microscope 710 and the second microscope 720 may be independent optical systems.

The first microscope 710 captures images of the specimen by Structured Illumination Microscopy (SIM). The SIM illuminates the specimen with a structured illumination having a periodic illumination pattern and generates a super-resolution microscope image representing a microstructure of the specimen smaller than a wavelength of the illumination light, based on interference fringes generated in the image of the specimen. This super-resolution microscope image is generated by calculation processing by reconstructing a plurality of images acquired by illuminating the specimen while changing the orientation and position of the illumination pattern of the structured illumination. Note that, for convenience of description, the expression of reconstruction is simply expressed as generation or image capturing.

On the other hand, the second microscope 720 captures images of the specimen by STochastic Optical Reconstruction Microscopy (STORM). STORM can reconstruct a fluorescent image (super-resolution microscope image) with a resolution higher than the illumination light wavelength by overlaying position information of fluorescent dyes detected with high precision from a plurality of fluorescent images. Note that, for convenience of description, the expression of reconstruction is simply expressed as generation or image capturing.

The microscope 700 captures images of an observation region including at least part of the specimen with the first microscope 710, and generates first microscope image data 401. Further, the microscope 700 captures images of an observation region including at least part of the specimen corresponding to the observation region captured by the first microscope 710 with the second microscope 720, and generates second microscope image data 402. In the present embodiment, the observation region of the second microscope 720 corresponding to the observation region of the first microscope 710 is specifically an imaging field of view (that is, the region of images to be captured) of the second microscope 720 including at least a partial region of the specimen included in an imaging field of view of the first microscope 710. Thus, an image of the specimen in the image captured by the second microscope 720 includes at least part of the image of the specimen in the image captured by the first microscope 710.

The first microscope image data 401 and the second microscope image data 402 are transmitted from the microscope 700 to the image processor 101. Here, the first microscope image data 401 and the second microscope image data 402 are generated in a general-purpose format such as JPEG, BMP. Note that, alternatively, it may be generated in a dedicated format capable of image processing by the image processor 101. Further, the image captured by the first microscope 710 is handled as data (for example, processed as image data in the image processor 101) until the image is displayed on the display 170. Therefore, hereinafter, it is referred to as the first microscope image data 401. Further, since the information indicated by the data is an image, it is also referred to as a first microscope image 401 by using the same reference numerals for convenience of description. Similarly, the second microscope image data 402 is also referred to as a second microscope image 402 by using the same reference numerals for convenience of description.

Figure 2:
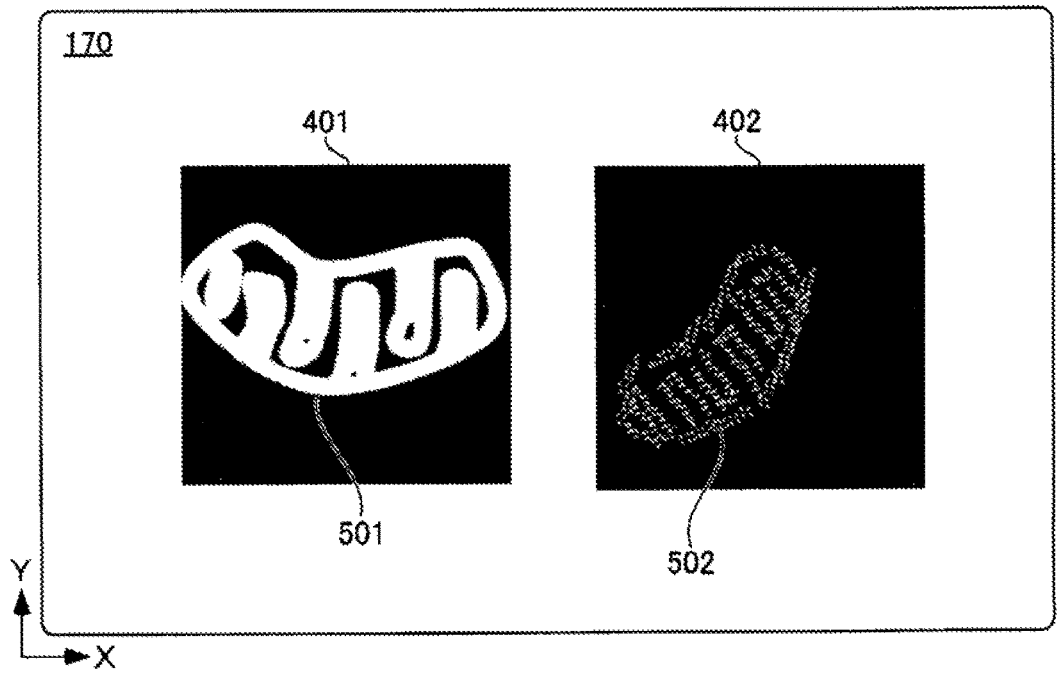
FIG. 2 illustrates an image displayed on a display 170.

FIG. 2 is a diagram illustrating a display screen of the display 170. In FIG. 2, the first microscope image 401 and the second microscope image 402 at the time of acquisition by the image processor 101 are displayed. Note that, although an X axis and a Y axis are appropriately depicted in FIG. 2 and subsequent figures, they are for describing the orientation and do not mean specific directions in the real space.

The first microscope image 401 displayed on the left side of the figure includes a specimen image 501. The second microscope image 402 displayed on the right side of the figure includes a specimen image 502 of the same specimen as the first microscope 710.

The first microscope image 401 and the second microscope image 402 are generated based on mutually different microscopies, thus, the two specimen images 501 and 502 in both microscope images are different in size of image magnification (sometimes referred to as size of image), orientation, and position. That is, in the example of FIG. 2, the size of the specimen image 502 in the second microscope image 402 is small with respect to the size of the specimen image 501 in the first microscope image 401 on the screen of the display 170.

Further, a longitudinal direction of the specimen image 501 in the first microscope image 401 is substantially parallel to the X-axis, whereas the specimen image 502 in the second microscope image 402 is sloped by about 45° from the X axis to the Y axis (that is, sloped in the right upward direction). Further, the specimen image 501 is located near a center of the first microscope image 401. The specimen image 502 is located near a left end of the second microscope image 402.

Thus, in the first microscope image 401 and the second microscope image 402, the sizes, slopes, and positions of the specimen images 501 and 502 in each image are different. Thus, even if the first microscope image 401 and the second microscope image 402 are displayed side by side on the display 170, it is difficult for the user to perform comparative observation in both images.

FIGS. 3 to 8 are diagrams for describing the processing of the image associating unit 140. The image associating unit 140 performs a processing of associating the first microscope image 401 with the second microscope image 402, for example, as described below. The processing of associating can be rephrased as a processing of associating pixel positions, which are two-dimensional coordinate positions of pixels constituting the first microscope image 401, and pixel positions, which are two-dimensional coordinate positions of pixels constituting the second microscope image 402. The processing of associating can be rephrased as a processing of constructing an associating relationship such that a pixel at a certain position in the second microscope image 402 is uniquely identified when a pixel at a certain position of the first microscope image 401 is identified, with respect to at least part of the pixels of the first microscope image 401 and the second microscope image 402. For example, the processing includes a processing of identifying a pixel in the second microscope image 402, wherein the position of the pixel in the microscope image is the same as the position of the pixel in the first microscope image 401. Since the position of the pixel is a position in the first microscope image 401 and the second microscope image 402, it can be referred to as an image position. Further, the processing of associating can also be rephrased as a processing of associating the first microscope image data 401 with the second microscope image data 402.

Figure 3:
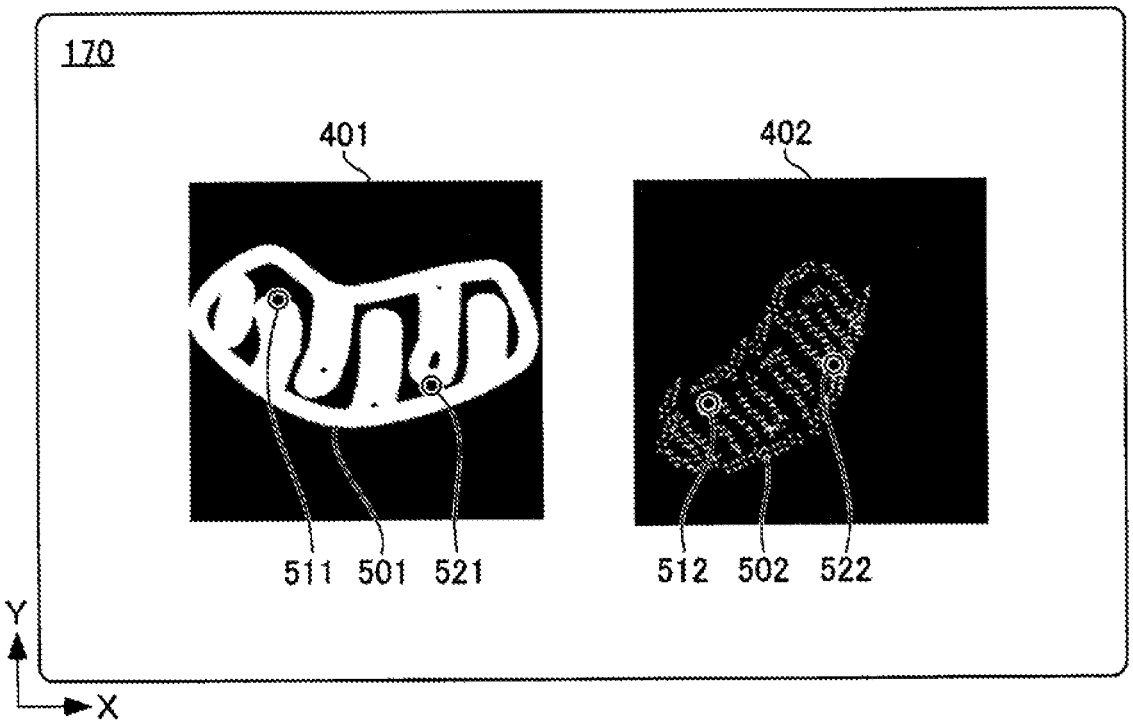
FIG. 3 illustrates an image displayed on the display 170.

FIG. 3 illustrates an image displayed on the display 170 after the state of FIG. 2. The accepting unit 150 accepts designation of a position in the first microscope image 401 from the user via the input device 130. The image associating unit 140 displays a marker 511 at the designated position. In the example of FIG. 3, the position in the specimen image 501 is designated.

The accepting unit 150 further accepts designation of a position, which is considered to correspond to the position designated in the first microscope image 401 from the user, in the second microscope image 402. In this case, the user designates the position considered to be the same site as the site of the specimen designated in the first microscope image 401 in the second microscope image 402. The image associating unit 140 displays a marker 512 at the designated position. In the example of FIG. 3, the position in the specimen image 502 is designated.

Similarly, an input for designation of a position different from the marker 511 in the first microscope image 401 and designation, in the second microscope image 402, of a position (in other words, a position different from the marker 512) considered to correspond to the position (that is, a position different from the marker 511) designated in the first microscope image 401, is accepted from the user. Based on the input to the input device 130, the accepting unit 150 identifies the position in the first microscope image 401 to display the marker 521, and identifies the position in the second microscope image 402 to display the marker 522. In a case where designating the position in the first microscope image 401 and the second microscope image 402, for example, by clicking the position in the first microscope image 401 and the second microscope image 402 by the user with a mouse, position information for identifying the position is identified, and the accepting unit 150 acquires the position information.

FIGS. 4 to 7 are diagrams illustrating the concept of a processing performed by the image associating unit 140 after the position described with reference to FIG. 3 is designated. Although the first microscope image 401 and the second microscope image 402 are illustrated as "images" in FIGS. 4 to 8, the image data processed inside the image processor 101 are illustrated for description, and such "images" are not generated or displayed on the display 170. In addition, the image processor 101 handles the first microscope image 401 as data. Therefore, hereinafter, the data also referred to as the first microscope image data. The information indicated by the data is an image, thus, the same reference numerals may be used to the data and the data may be illustrated as an image. The same applies to the second microscope image 402.

Figure 4:
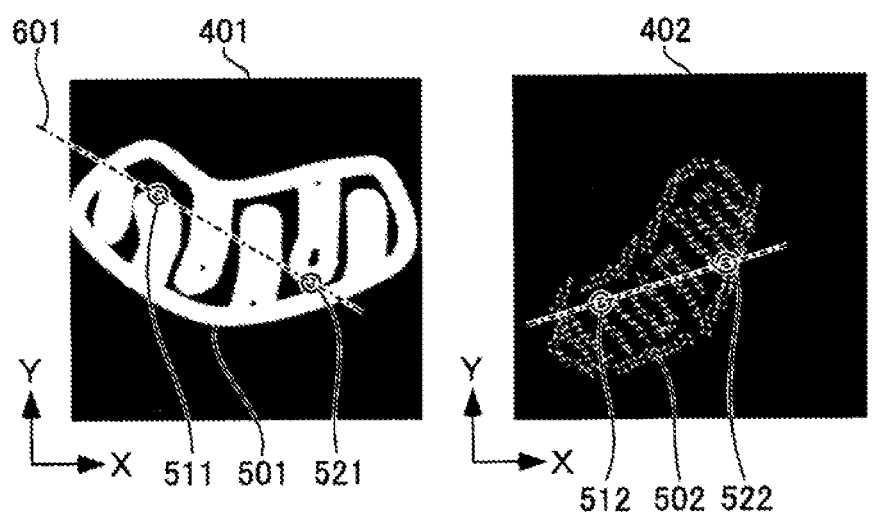
FIG. 4 is a diagram illustrating a concept of processing in an image processor 101.

FIG. 4 is a diagram for describing a processing of image data for matching the orientation of the specimen image 501 in the first microscope image 401 and the specimen image 502 in the second microscope image 402. First, the image associating unit 140 generates data of a virtual straight line 601 connecting the markers 511 and 521 in the first microscope image 401. Similarly, the image associating unit 140 generates data of a virtual straight line 602 connecting the markers 512 and 522 in the second microscope image 402.

Figure 5:
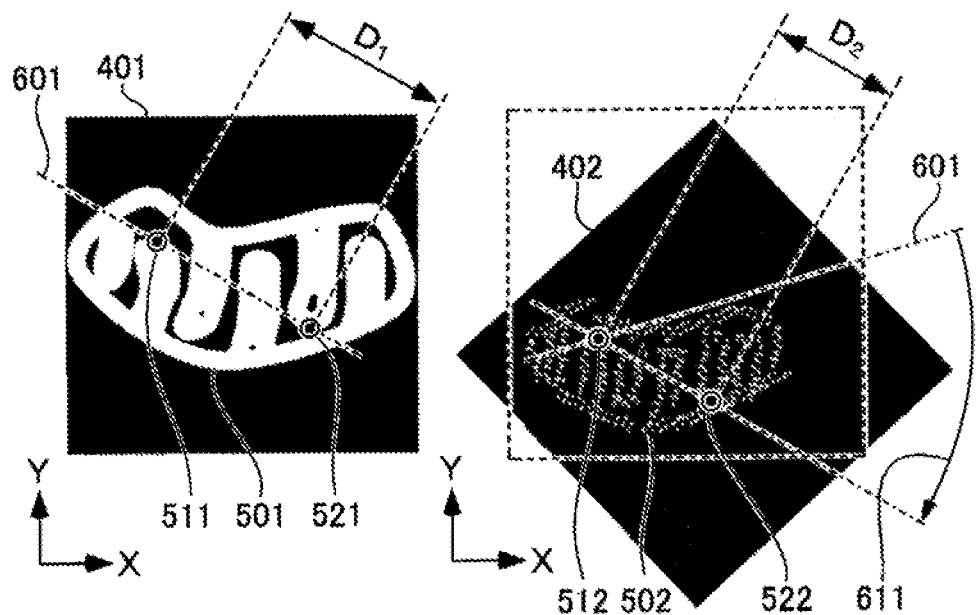
FIG. 5 is a diagram illustrating a concept of processing in the image processor 101.

FIG. 5 is a diagram for describing the next processing of FIG. 4 by the image associating unit 140. In order to match the slope of the straight line 601 of the first microscope image 401 with the slope of the straight line 602 of the second microscope image 402, as indicated by an arrow 611 of FIG. 5, the image associating unit 140 processes the second microscope image data 402 so as to rotate the entire second microscope image 402 from the state of FIG. 4 indicated by a dashed frame of FIG. 5 to the orientation illustrated in FIG. 5 in a clockwise direction of FIG. 5.

Further, the image associating unit 140 calculates a distance $D_1$ between the markers 511 and 521 of the first microscope image 401. Subsequently, the image associating unit 140 calculates a distance $D_2$ between the markers 512 and 522 of the second microscope image 402.

Figure 6:
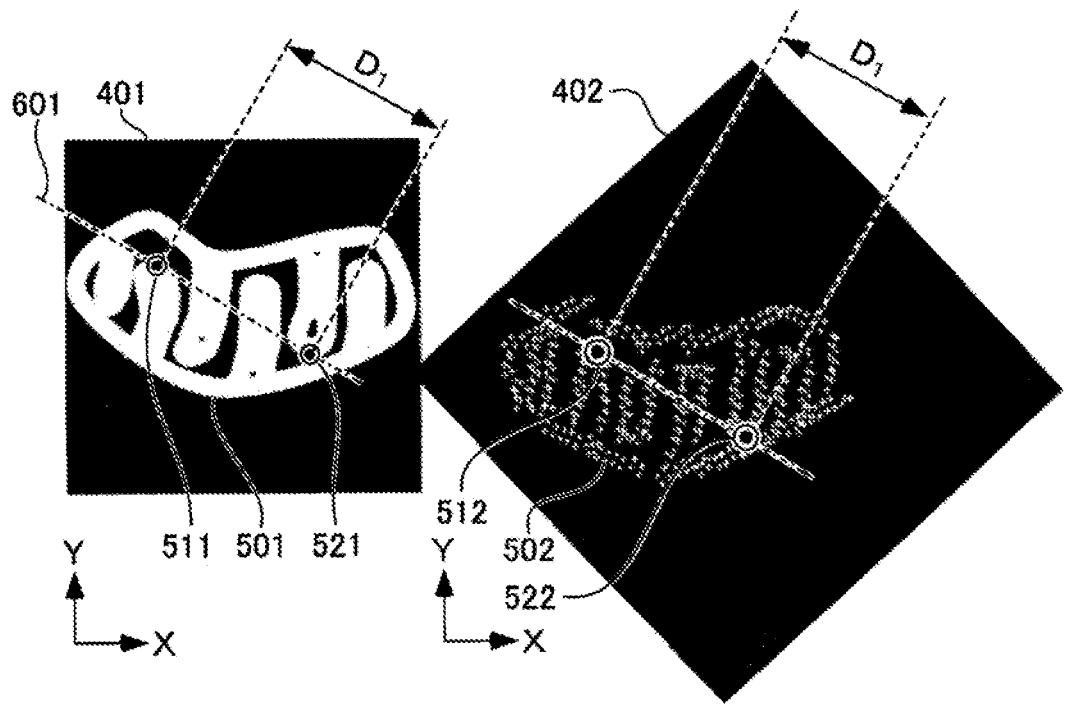
FIG. 6 is a diagram illustrating a concept of processing in the image processor 101.

FIG. 6 is a diagram for describing the next processing of FIG. 5 by the image associating unit 140. The relation of the distances $D_2$ and $D_1$ is $D_2<D_1$, thus, when the specimen image 502 (that is, the second microscope image 402) is multiplied by $D_1/D_2$, the specimen image 502 is coincident with the specimen image 501 (that is, the first microscope image 401) in size (magnification) as illustrated in FIG. 6. Therefore, the image associating unit 140 processes the second microscope image data 402 such that the second microscope image 402 is multiplied by $D_1/D_2$.

Figure 7:
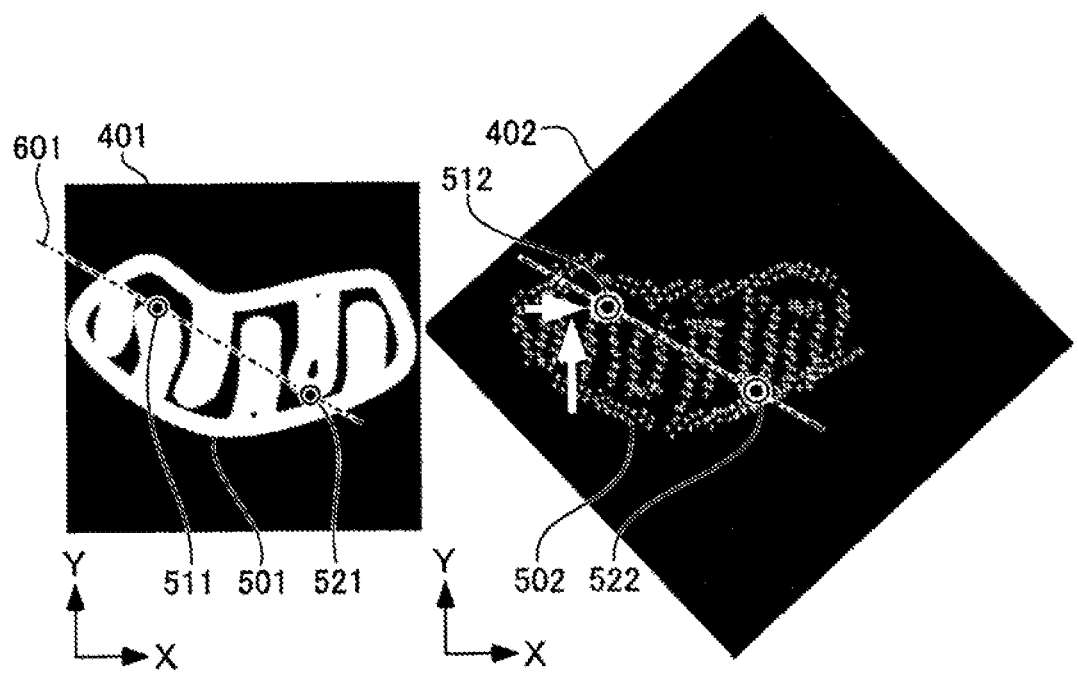
FIG. 7 is a diagram illustrating a concept of processing in the image processor 101.

FIG. 7 is a diagram for describing the next stage of processing by the image associating unit 140. The image associating unit 140 processes the second microscope image data 402 such that the position of the marker 512 of the second microscope image 402 is matched with the position of the marker 511 of the first microscope image 401. Here, matching the position of the marker 512 with the position of the marker 511 is to match the position (coordinate) of the marker 512 in the XY coordinate system of the second microscope image 402 with the position (coordinate) same as the position (coordinate) of the marker 511 in the XY coordinate system of the first microscope image 401.

Figure 8:
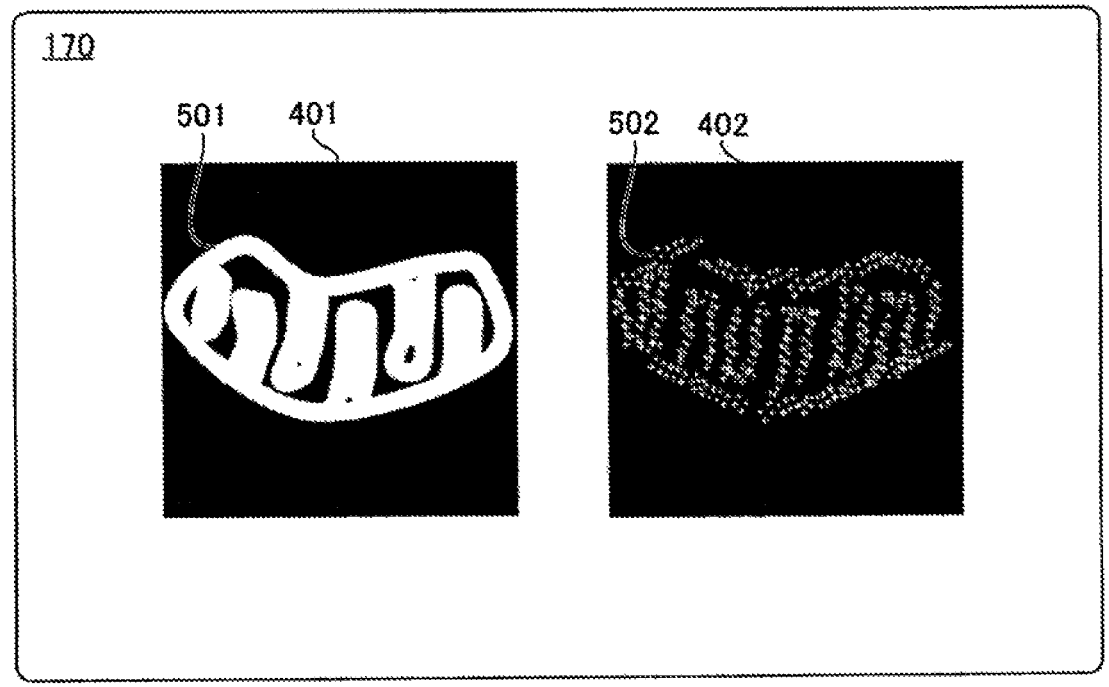
FIG. 8 illustrates an image displayed on the display 170.

FIG. 8 illustrates a state in which the first microscope image 401 and the second microscope image wherein the sizes, the slopes, and the positions of the specimen images (that is, the first microscope image 401 and the second microscope image 402) have been matched by the image associating unit 140, are displayed side by side on the screen of the display 170. In the example illustrated in FIG. 8, the image generator 160 displays, on the display 170, only a part of the second microscope image 402 on which the image processing has been performed such that the specimen image 501 in the first microscope image 401 and the specimen image 502 in the second microscope image 402 are matched in the sizes of magnification, the slopes, and the positions as illustrated in FIG. 7, the part of the second microscope image 402 having the same size as the first microscope image 401. The specimen image 501 in the first microscope image 401 and the specimen image 502 in the second microscope image 402 are matched in the size of the magnification, the slope, and the position. Thus, the first microscope image 401 and the second microscope image 402 can be easily performed comparative observation by the user.

Figure 9:
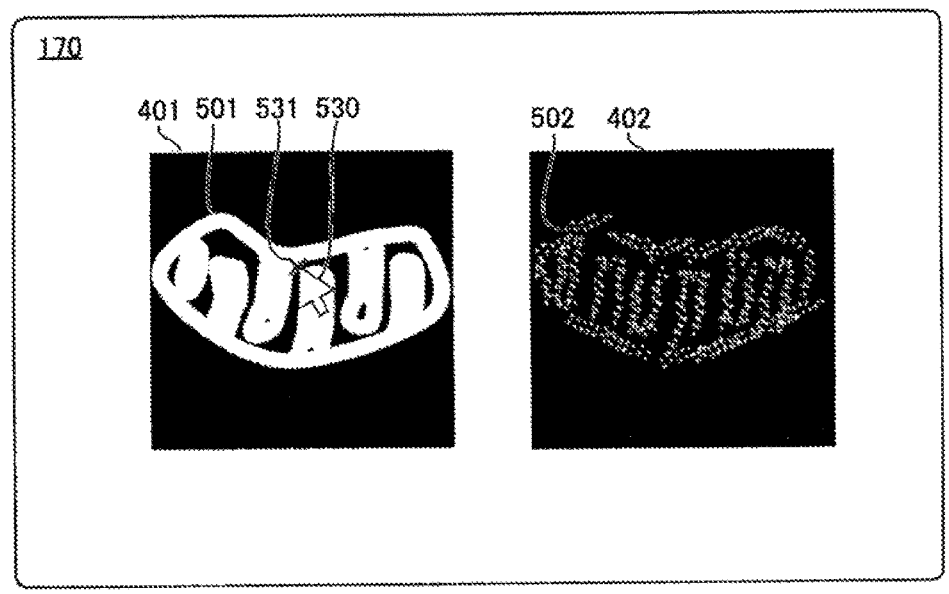
FIG. 9 illustrates an image displayed on the display 170.

Note that, in the example described above, by processing the second microscope image data 402 so as to rotate, minify, and further move the second microscope image 402, the image associating unit 140 matches the size, the orientation, and the position of the specimen image 502 of the second microscope image 402 with the size, the orientation, and the position of the specimen image 501 of the first microscope image 401. Alternatively, the image associating unit 140 may process the first microscope image data 401 so as to rotate, magnify, and move the first microscope image 401, to match the size, the orientation, and the position of the specimen image 501 of the first microscope image 401 with the size, the orientation, and the position of the specimen image 502 of the second microscope image 402, FIG. 9 illustrates an image displayed on the display 170 with respect to the processing of the image generator 160. In FIG. 9, the sizes, orientations, and positions of the specimen images of the first microscope image 401 and the second microscope image 402 are displayed in a matched state as illustrated in FIG. 8, the accepting unit 150 accepts designation of at least part of the position information in the first microscope image 401 by the input device 130.

In this case, the image generator 160 displays a cursor 530 on the first microscope image 401 as illustrated in FIG. 9 by input from the user by the input device 130, for example, via a movement of the mouse. Furthermore, the accepting unit 150 accepts the position of a point designated by operation from the user of depressing a mouse button as position information (for example, coordinate of a point). Note that, in FIG. 9, the user presses the mouse button at the position where the cursor 530 is displayed to designate a point. The position of the accepted point is displayed on the screen of the display 170 by an X-shaped mark 531. Note that instead of pressing the mouse button, the accepting unit 150 may accept designation of a point by pressing a return key, touching the display 170 in a case where the display 170 is a touch panel, or the like.

Figure 10:
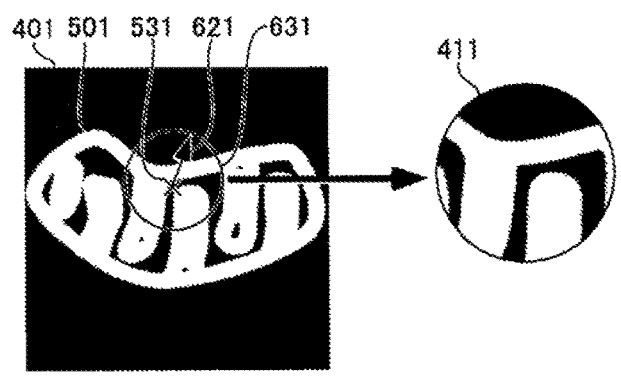
FIG. 10 is a diagram illustrating a concept of processing in the image processor 101.

FIG. 10 is a diagram for describing the processing of the image generator 160. The image generator 160 obtains position information (for example, coordinates of a point) of a point in the first microscope image 401 accepted by the accepting unit 150 from the accepting unit 150. Then, the image generator 160 identifies a first magnified region 631 corresponding to the position of the point. More specifically, based on the acquired position information of the point in the first microscope image 401, the image generator 160 specifies a preset region including the point accepted by the accepting unit 150 as a region to be magnified, that is, as the first magnified region 631. In the example as illustrated in the figure, the first magnified region 631 is a region surrounded by a circle having a preset radius 621 centering on the position of the mark 531.

Note that the accepting unit 150 may accept a designation that the position of the region in the first microscope image 401 is set as the position information instead of a designation that the position of the point in the first microscope image 401 is set as the position information by the input device 130. In this case, for example, in the first microscope image 401, a rectangle in which a moving amount is set as a diagonal line is displayed when the user moves while dragging the mouse at a certain position, and the accepting unit 150 may accept the rectangle by releasing the drag. Then, the image generator 160 acquires information (for example, coordinates of the four vertices of the rectangle) regarding the position of the designated rectangle from the accepting unit 150, and identifies a designated preset region (for example, a region having a diagonal line of the designated rectangle as a diameter) including the designated rectangle as the first magnified region 631 based on the information. Further, the accepting unit 150 may accept coordinates of the first microscope image 401 (first microscope image data 401) directly input by the keyboard or the like as the input device 130, as position information. In this case, coordinates of one point may be accepted so as to designate a point in the first microscope image 401, or coordinates of a plurality of points (for example, coordinates of four vertices in the case of a rectangular region) may be accepted so as to designate a region in the first microscope image 401. The image generator 160 acquires the accepted coordinates and identifies the first magnified region 631 including points and regions corresponding to the coordinates. Further, the accepting unit 150 may accept a designation that the position of the first magnified region 631 itself is set as position information. In this case, in the first microscope image 401, a circle in which the moving amount is set as a diameter or a radius is displayed by moving while dragging the mouse at a certain position, and the circle may be accepted as the first magnified region 631 by releasing the drag. Then, the image generator 160 acquires information (for example, the center coordinates and the radius of the circle) regarding the position of the designated circle (the first magnified region 631), and identifies the designated circle as the first magnified region 631. In any of the cases described above, the designation of the region is not limited to a rectangle or a circle and may be designated in another shape.

Further, as illustrated in FIG. 10, the image generator 160 generates a first magnified image 411 magnifying the first magnified region 631 in the first microscope image 401. The magnification of the first magnified image 411 may be the magnification preset in the image processor 101, or may be inquired to the user by the image processor 101 after the position information is designated. It can be said that the first magnified image 411 is an image displayed larger than the size when the first magnified region 631 of the first microscope image 401 is displayed on the display 170. Note that in generating the first magnified image 411, in a case where part of pixels forming the image does not exist in the first microscope image 401 and a defect occurs in the image, the image generator 160 may generate supplementary pixels to compensate for the defective pixels. Note that, since the first magnified region 631 is at least a partial region of the first microscope image 401, it can be said that the first magnified image 411 is an image magnifying at least a partial region of the first microscope image 401.

Figure 11:
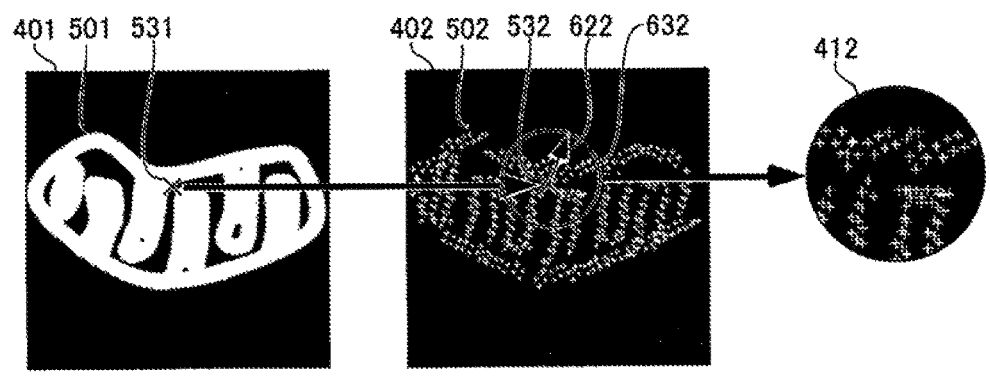
FIG. 11 is a diagram illustrating a concept of processing in the image processor 101.

FIG. 11 is a diagram for describing processing after FIG. 10. The image generator 160 identifies a point in the second microscope image 402 corresponding to a point in the first microscope image 401 in which the designation has been accepted by the accepting unit 150. Specifically, the image generator 160 identifies a point of a position in the second microscope image 402, wherein the position of the point is the same as the position of the point in the first microscope image 401 in which the designation has been accepted. In other words, the image generator 160 identifies a point in the second microscope image 402, wherein the position of the point in the microscope image is the same as the position of the point in the first microscope image 401 in which the designation has been accepted. In other words, the image generator 160 identifies a pixel in the second microscope image 402, wherein the position of the pixel is the same as the position of the pixel corresponding to the point in the first microscope image 401 in which the designation has been accepted.

Next, the image generator 160 identifies a second magnified image 632 by identifying a circular region centering the point identified in the second microscope image 402. The second magnified region 632 has the same radius 622 as the first magnified region 631. Further, the image generator 160 magnifies the image of the second magnified region 632 with the same magnification as the magnified magnification of the first magnified region 631 for the second microscope image data 402, and generates the second magnified image 412. Note that the second magnified region 632 identified by the image generator 160 may not be set centered on a point (a point identified by the image generator 160) in the second microscope image 402, the position where the second magnified region 632 is set may be separated from the center of the point (the point identified by the image generating part 160) in the second microscope image 402 to a degree that there is no problem in observing the second magnified image 412.

Note that, the second magnified image 412 is a magnified image by magnifying the region including the point of the second microscope image 402 corresponding to the point designated to be magnified in the first microscope image 401, thus it can be said that the second magnified image 412 is related to the first magnified image 411. However, the second magnified image 412 generated in association with the first magnified image 411 by the image generator 160 is not limited to the case that the positions of the points correspond to each other, as long as the second magnified image 412 and the first magnified image 411 have some association. Further, the second magnified region 632 is at least a partial region of the second microscope image 402, thus, it can be said that the second magnified image 412 is an image magnifying at least a partial region of the second microscope image 402.

Figure 12:
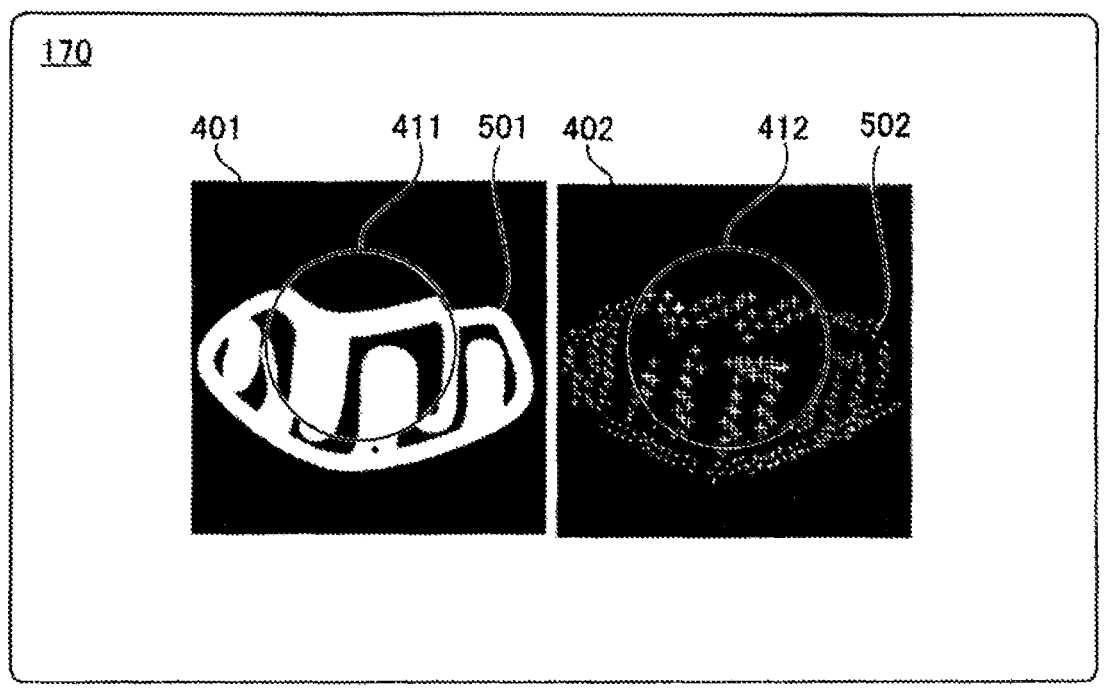
FIG. 12 illustrates an image displayed on the display 170.

FIG. 12 is an example in which the first magnified image 411 and the second magnified image 412 are displayed on the display 170. The image generator 160 overlaps the first magnified image 411 on the first microscope image 401 and displays it on the display 170. The center of the first magnified image 411 matches with the position of the point in the first microscope image 401 in which the designation has been accepted by the accepting unit 150, The first magnified image 411 is displayed such that the surroundings of the point at which the designation is accepted of the first microscope image 401 are magnified as if observed under a magnifying glass. Therefore, the user can observe a magnified image of the region focused by the user (that is, the region including the position designated in the first microscope image 401) while viewing over the entire first microscope image 401, and thus an intuitive observation operation of the microscope image can be performed.

Further, the image generator 160 overlaps the second magnified image 412 with the second microscope image 402 and displays the second magnified image 412, The center of the second magnified image 412 matches with the position of the point identified by the image generator 160 in the second microscope image 402. Therefore, the second magnified image 412 is displayed such that the surroundings of the point identified in the second microscope image 402 are magnified as if observed under a magnifying glass, thus the user can perform an intuitive observation operation of the microscope image while viewing over the entire second microscope image 402.

Further, the first microscope image 401 (specimen image) and the second microscope image 402 (specimen image) are displayed such that the size (magnification), the orientation, and the position are matched in advance. The first magnified image 411 and the second magnified image 412 are magnified by the same magnification with respect to the first microscope image 401 and the second microscope image 402 displayed. Accordingly, even when the magnification and the orientation of the first microscope image 401 (specimen image) and the second microscope image 402 (specimen image) are different and captured, comparative observation of the entire image of the first microscope image 401 and the second microscope image 402 can be easily performed. Further, comparative observation of the region focused by the user in the first microscope image 401 and the second microscope image 402 can be easily performed.

In addition, in a case where the user designates a position of a point to be magnified in the first microscope image 401, not only the first magnified image 411 of a region including the position but also the second magnified image 412 of the region including a corresponding point are displayed on the display 170. Therefore, the first magnified image 411 and the second magnified image 412 can be easily performed comparative observation by omitting the labor hour of designating the position of the point to be magnified in each of the first microscope image 401 and the second microscope image 402.

Note that in a case where part of the first magnified image 411 protrudes from the first microscope image 401 and overlaps the second microscope image 402, the image generator 160 may display the first magnified image 411 by hiding part of the second microscope image 402 overlapping with the first magnified image 411. In addition, in a case where part of the second magnified image 412 protrudes from the second microscope image 402 and overlaps with the first microscope image 401, the image generator 160 may display the second magnified image 412 by hiding part of the first microscope image 401 overlapping with the second magnified image 412.

Further, in a case where part of the first magnified region 631 and the second magnified region 632 protrudes from the first microscope image 401 and the second microscope image 402, in the first magnified image 411 and the second magnified image 412, the region corresponding to the protruded magnified region may be filled with a plain image by the image generator 160.

Figure 13:
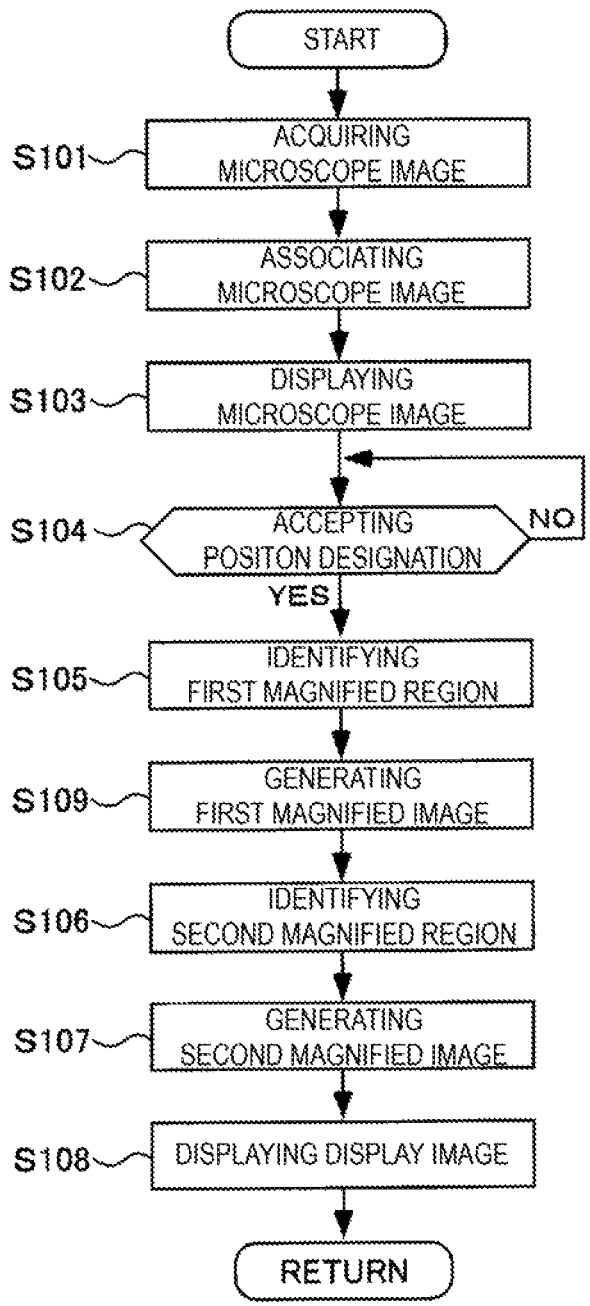
FIG. 13 is a flowchart illustrating a procedure of processing in the image processor 101.

FIG. 13 is a flowchart illustrating a processing procedure in the image processor 101. First, the image processor 101 acquires the first microscope image 401 (first microscope image data) and the second microscope image 402 (second microscope image data) from the microscope 700 (S101).

Next, the image associating unit 140 performs association of the first microscope image 401 and the second microscope image 402 using the method illustrated in FIGS. 3 to 7, with respect to the first microscope image 401 and the second microscope image 402 (S102). Based on the association, the image associating unit 140 matches the sizes, the orientations and the positions of the specimen images of the first microscope image 401 and the second microscope image 402 so as to be displayed on the display 170 as illustrated in FIG. 8 (S103).

Next, the image processor 101 monitors the input from the input device 130 by the accepting unit 150 and waits for the input of the position information in the first microscope image 401 (S104: NO). When the position information from the user is input through the input device 130 (S104: YES), the image generator 160 identifies the first magnified region 631 of the first microscope image 401 (S105). The image generator 160 generates the first magnified image 411 in which the first magnified region 631 in the first microscope image 401 is magnified (S109).

Next, the image generator 160 identifies the second magnified region 632 of the second microscope image 402 (S106). Here, since the first microscope image 401 and the second microscope image 402 are matched in size, orientation, and position of the specimen image, as described with reference to FIG. 11, the position of the point in the second microscope image 402 that is the same as the position of the point in the first microscope image 401 input in step S104, is identified as the position of the center of the second magnified region 632. Next, the image generator 160 generates the second magnified image 412 by magnifying the second magnified region 632 in the second microscope image 402 (S107). Further, as described with reference to FIG. 12, the image generator 160 displays the first microscope image 401 and the second microscope image 402, and the first magnified image 411 and second magnified image 412 side by side on the display 170 (S108).

Note that, a communication unit capable of acquiring a microscope image from the outside of the microscope system 100 may be provided in the image processor 101. The communication unit may acquire the first microscope image 401 or the second microscope image 402 from an external database or the like via the Internet, a dedicated line, or the like and may be used in the image processor 101.

In step S102 of FIG. 13, instead of accepting designation of a position used for associating the first microscope image 401 and the second microscope image 402 from the user, the image associating unit 140 may automatically extract an image of a plurality of markers included in the first microscope image 401 and the second microscope image 402, and use the positions of the markers. In this case, before imaging the first microscope image 401 and the second microscope image 402, a marker is introduced to or around the specimen. As a marker to be introduced, existing markers such as gold fine particles and fluorescent labels can be used.

In this case, the image associating unit 140 calculates a rotation amount, a size ratio and a moving amount of the second microscope image 402 such that the positions (position coordinates in the first microscope image 401) of the plurality of markers in the first microscope image 401 is coincident with the positions (position coordinates in the first microscope image 402) of the images of the plurality of markers in the second microscope image 402 using the same method as described with reference to FIGS. 3 to 7. As a result, in step S102, the image associating unit 140 can automatically associate the first microscope image 401 and the second microscope image 402 without designating the position for associating the first microscope image 401 with the second microscope image 402, thus the user can reduce the labor hour of the comparative observation of the first microscope image 401 and the second microscope image 402. Further, the position of the marker introduced to or around the specimen does not change when the first microscope image 401 and the second microscope image 402 are captured, thus association can be performed accurately by using the image of the marker to perform the association. Note that the user may designate a plurality of markers in the first microscope image 401 and a plurality of markers in the second microscope image 402.

Note that, in step S102, the image associating unit 140 may associate the microscope images with each other by using morphological features that appear in both the first microscope image 401 and the second microscope image 402. For example, protrusion structure of a cell surface, shape of a mitochondrion in the cell, scratch of a cover glass, and the like may be used as the marker. Note that, the image associating unit 140 may automatically extract the images of these markers to perform association of the microscope images with each other, or the image associating unit 140 may accept the designation of the positions of the images of these markers by the user to associate the microscope images with each other.

Figure 14:
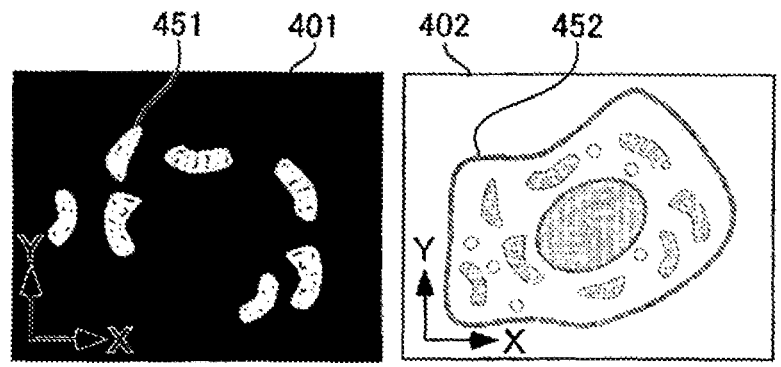
FIG. 14 is a diagram for describing another example of step S102 of FIG. 13.

FIG. 14 is a diagram for describing another example of step S102 of FIG. 13. In FIG. 14, the first microscope image 401 is an image acquired by the SIM, and the second microscope image 402 is an image acquired by an electron microscope. Here, both the microscope image of the SIM and the microscope image of the electron microscope represent the specimen images 451 and 452 as they are, Therefore, in step S102 of FIG. 13, the image associating unit 140 associates the first microscope image 401 with the second microscope image 402 by performing pattern matching on the first microscope image 401 of the SIM and the second microscope image 402 of the electron microscope.

In this example, in step S102 of FIG. 13, instead of accepting designation of a plurality of positions using both microscope images from the user, the image associating unit 140 performs pattern matching between the first microscope image 401 and the second microscope image 402. In this case, the image associating unit 140 calculates a rotation amount, a magnification, and a position displacement amount of the second microscope image 402 with respect to the first microscope image 401 as the degree of similarity between the microscope images becomes the highest. Then, as illustrated in FIG. 8, the image processing unit 140 performs image processing on the second microscope image 402 (second microscope image data) and associates the first microscope image 401 with the second microscope image 402, based on the calculated values. Thus, the microscope images can be easily associated with each other by pattern matching, and the labor hour of the comparative observation between the microscope images is reduced. Here, as the pattern matching, a known method such as a normalized correlation method, or a geometric shape pattern matching method may be used. In addition, pattern matching can be rephrased as template matching.

Note that, the image associating unit 140 may not perform pattern matching using the entire image in each microscope image. For example, the accepting unit 150 may accept a designation from the user as a region for performing pattern matching on a partial region of the first microscope image 401, and the image associating unit 140 may pattern match the designated region in the first microscope image 401 with the second microscope image 402, further, the accepting unit 150 may accept designation of a partial region of the second microscope image 402 from the user, and the image associating unit 140 may pattern match the designated region in the first microscope image 401 with the designated region in the second microscope image 402. By narrowing the region of the image used for pattern matching in the microscope images, the possibility that foreign matter (such as dust) or texture (such as stain) that causes a reduction of the similarity of pattern matching is included in one image used for pattern matching (region used for pattern matching) is reduced, thus the accuracy of associating the microscope images with each other can be improved, and the microscope images can be accurately performed comparative observation with each other.

Figure 15:
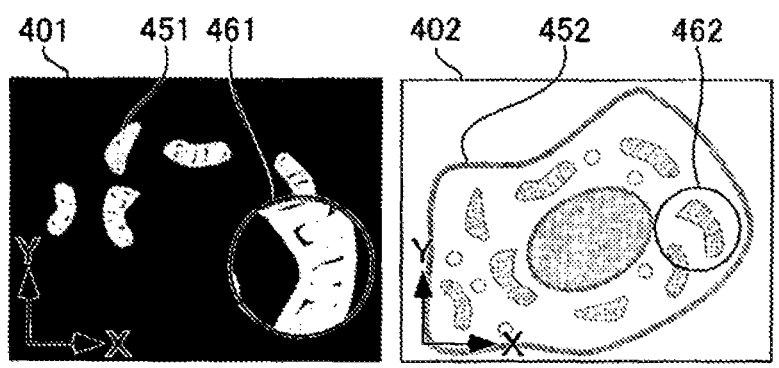
FIG. 15 is a diagram for describing still another example of step S102 of FIG. 13.

FIG. 15 is a diagram for describing a modification of the pattern matching of FIG. 14. In this modification, the image associating unit 140 performs pattern matching between the first magnified image 461 and the second microscope image 402 instead of the pattern matching between the first microscope image 401 and the second microscope image 402 described in FIG. 14.

In this case, in step S102 of FIG. 13, the image associating unit 140 accepts an input of a position to be magnified for pattern matching from the user via the input device 130. In the step S102, the image associating unit 140 performs pattern matching using a pattern included in the first magnified image 461 at the position as illustrated in FIG. 15. A method of pattern matching is the same as that described with reference to FIG. 14.

By associating the first microscope image 401 with the second microscope image 402 based on the pattern included in the first magnified image 461, the range of the first magnified image 461 is narrower than that of the first microscope image 401, thus, as described above, the possibility that dust or the like is included in the first magnified image 461 can be reduced, and the possibility of erroneous detection of pattern matching can be reduced. Note that, in the aforementioned modification, the pattern included in the first magnified image 461 is searched with respect to the second microscope image 402. However, designation of a position to be magnified in the second microscope image 402 may be accepted, and a pattern included in the magnified image magnifying a region including the position may be pattern matched with respect to the first microscope image 401.

Further, as another method of step S102 of FIG. 13, the image associating unit 140 may acquire a setting condition of the microscope 700 when the first microscope image 401 is captured and a setting condition of the microscope 700 when the second microscope image 402 is imaged, and may associate the first microscope image 401 with the second microscope image 402 based on these setting conditions. Here, the setting conditions include image-forming magnification of the microscope, stage coordinates, and the like. The image associating unit 140 may associate the microscope images with each other by using both the image-forming magnification and the stage coordinates, or may associate by using either the image-forming magnification or the stage coordinates.

The image-forming magnification is a magnification at which an image of the specimen is formed on an imaging surface of an imaging device (such as CCD or CMOS) of a microscope when the specimen on the stage is captured by each microscope. The image associating unit 140 can associate the magnification of the specimen image 501 in the first microscope image 401 with the magnification of the specimen image 502 in the first microscope image 401 according to the image-forming magnification when the first microscope image 401 is captured and the image-forming magnification when the second microscope image 402 is captured. Thus, for example, the size of the specimen image 501 in the first microscope image 401 and the size of the specimen image 502 in the second microscope image 402 when displayed on the display 170 can be matched. Therefore, comparative observation of both the first microscope image 401 and the second microscope image 402 become easy.

Further, the stage coordinates are coordinates of the stage on which the specimen is placed, wherein the coordinates are acquired when the specimen is captured by each microscope. The image associating unit 140 can associate the position of the specimen image 501 in the first microscope image 401 with the position of the specimen image 502 in the second microscope image 402 from the stage coordinates when the first microscope image 401 is captured and the stage coordinates when the second microscope image 402 is captured. Thus, for example, the position of the specimen image 501 in the first microscope image 401 and the position of the specimen image 502 in the second microscope image 402 can be matched when displayed on the display 170. Therefore, comparative observation of both the first microscope image 401 and the second microscope image 402 become easy.

Note that, although the size, the orientation, and the position of the image are matched and displayed based on the association the first microscope image 401 with the second microscope image 402 in step S103 of FIG. 13, it may be omitted that the first microscope image 401 and the second microscope image 402 are displayed by matching the size, the orientation, and the position of the image. In this case, in step S102, the process proceeds to step S102, in any of the method of associating the microscope images described with reference to FIGS. 3 to 7, the method of associating the microscope images described with reference to FIGS. 14 and 15, and the method of associating the microscope images using the aforementioned setting conditions of the microscope at the time of imaging the microscope images, the image generator 160 identifies the second magnified region in step S106 in accordance with the identification of the first magnified region in step S105, based on the size, the orientation and the position of each image identified in the association between the first microscope image 401 and the second microscope image 402.

Figure 16:
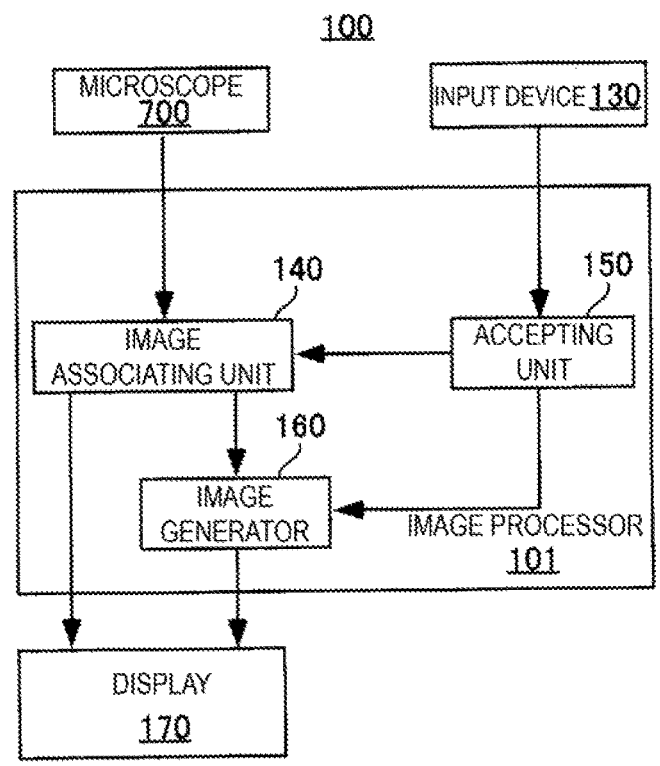
FIG. 16 is a block diagram of a microscope system 105.
Figure 17:
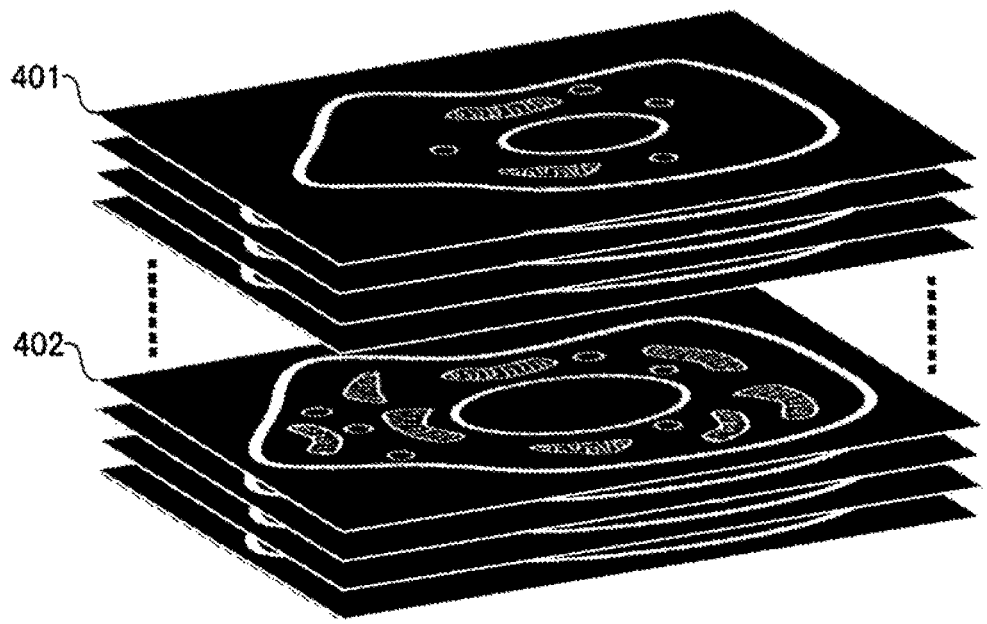
FIG. 17 is a diagram for describing another combination of microscope images.

FIG. 16 is a block diagram of the microscope system 105 using other microscope images, and FIG. 17 is a diagram for describing a microscope image used in the microscope system 105. In this example, microscope images captured with different specimens from different focal planes are used. Note that the microscope system 105 is different from the microscope system 100 in that the microscope 700 is single. In the microscope system 105, the same components as those of the microscope system 100 are denoted by the same reference numerals, and description of them is omitted.

In a microscopy such as a STET) and a Confocal Laser Scanning Microscope (CLSM), by capturing images on different focal planes with different heights of the specimen as focal planes, a microscope image group continuous in a height direction (in other words, having three-dimensional position information) can be generated. In the present embodiment, in step S101 of FIG. 13, the image associating unit 140 acquires a microscope image group captured on a plurality of focal planes from a microscope 700 which is single.

In this case, by synthesizing microscope images (intensity distribution) of the microscope image group, the image associating unit 140 generates three dimensional microscope image data (three dimensional microscope image) having three-dimensional intensity distribution information. The accepting unit 150 accepts designation of two plane microscope image data (plane microscope image) to be cut with planes parallel to each other as the first microscope image 401 and the second microscope image 402, from the three dimensional microscope image data (three dimensional microscope image). In this case, for example, the accepting unit 150 accepts the designation of the first microscope image 401 and the second microscope image 402 with the mouse by the user in rendering image based on the three dimensional microscope image data displayed on the display 170.

Further, in step S102 of FIG. 13, the image associating unit 140 associates the first microscope image 401 with the second microscope image 402. In this case, any one of the method of associating the microscope images with each other described in FIGS. 3 to 7, the method of associating the microscope images with each other described in FIGS. 14 and 15, and the method of associating by using the setting conditions of the microscope at the time of imaging the microscope image may be used in the image associating unit 140. Accordingly, for example, even in a case where the specimen moves with a time difference occurring when imaging the different focal planes, the association can be appropriately performed. Therefore, even among the plane microscope images cut out in different planes, the sizes, the orientations, and the positions of images of the specimens of both microscope images are matched, thus comparative observation can be easily performed.

Further, the operations after step S103 of FIG. 13 are performed. Specifically, the image associating unit 140 displays the first microscope image 401 and the second microscope image 402 on the display 170 (S103 of FIG. 13). When the position information from the user is input via the input device 130 (S104 of FIG. 13: YES), the image generator 160 identifies the first magnified region 631 of the first microscope image 401 (S105 of FIG. 13), and generates the first magnified image 411 acquired by magnifying the first magnified region 631 in the first microscope image 401 (S109 of FIG. 13).

Next, the image generator 160 identifies the second magnified region 632 of the second microscope image 402 (S106 of FIG. 3), and generates the second magnified image 412 in which the second magnified region 632 in the second microscope image 402 is magnified (S107 of FIG. 13). Further, as described with reference to FIG. 12, the image generator 160 displays the first microscope image 401 and the second microscope image 402, the first magnified image 411 and the second magnified image 412 side by side on the display 170 (S108 of FIG. 13).

Note that, in the present example, the three dimensional microscope image data was generated from the microscope image group acquired from the microscope 700 which is single. Alternatively, the microscope images may be acquired from a plurality of microscopes, and the plurality of the microscope images may be synthesized to generate the three dimensional microscope image data.

Further, as the first microscope image 401 and the second microscope image 402, the user can freely designate the orientation of each plane from which the three dimensional microscope image is cut out via the input device 130. For example, as the first microscope image 401 and the second microscope image 402, the planes parallel to each other in an arbitrary direction may be cut out from the three dimensional microscope image data (three dimensional microscope image). Further, in a case where there is no problem in comparative observation, as the first microscope image 401 and the second microscope image 402, planes which are not parallel to each other may be cut out from the three dimensional microscope image data (three dimensional microscope image).

Note that, in a microscopy method such as STED and a Confocal. Laser Scanning Microscope (CLSM), the same objective lens is often used for detection of fluorescence intensity at each focal plane. In the case where t plane microscope image generated based on the group of the microscope images at the plurality of focal planes using the same objective lens is used as the first microscope image 401 and the second microscope image 402, in the method of associating the first microscope image 401 with the second microscope image 402 illustrated in FIGS. 3 to 7, the process of matching the size of the image may be omitted in step S102 of FIG. 13. Further, in a case where the specimen does not move, the first microscope image 401 and the second microscope image 402 may have the same orientation, size, and position. In this case, the association between the first microscope image 401 and the second microscope image 402 illustrated in FIGS. 3 to 7 may be omitted in step S102 of FIG. 13.

Figure 18:
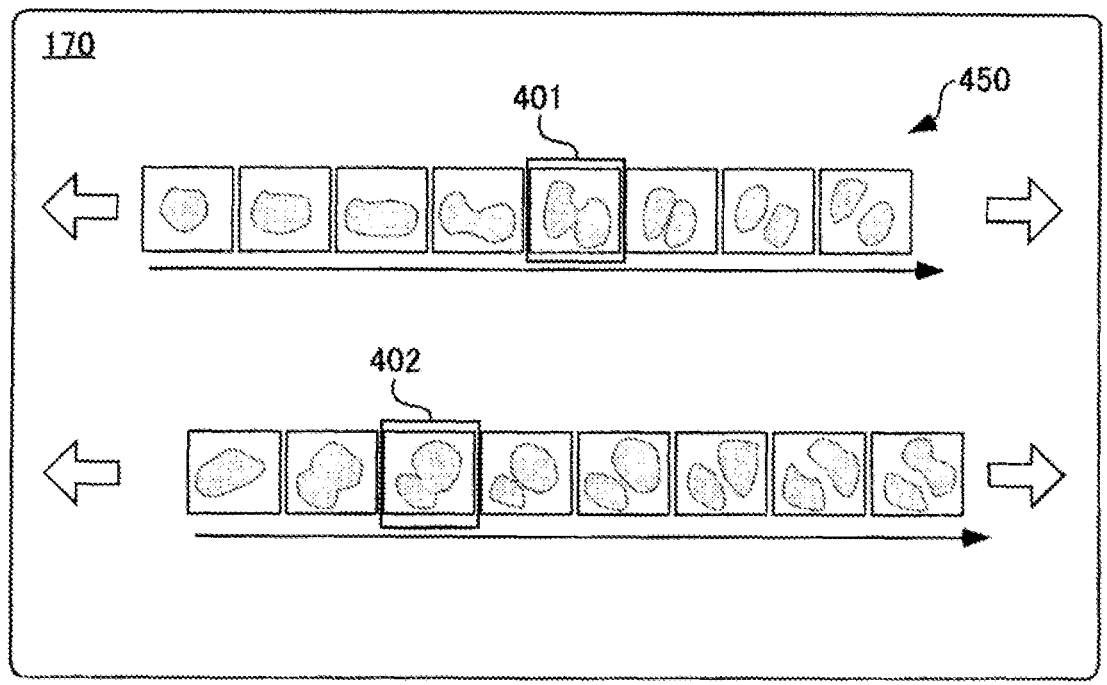
FIG. 18 is a diagram for describing still another combination of the microscope images.

FIG. 18 is a diagram illustrating another combination of the microscope images used in the microscope system 105 of FIG. 16. A microscope image group 450 of FIG. 18 includes a plurality of the microscope images (an image group acquired by so-called time-lapse imaging) acquired by capturing an observation region (imaging field of view of a microscope) every arbitrary elapsed time. In the present example, in step S101 of FIG. 13, the image associating unit 140 acquires the microscope image group captured by time-lapse imaging with the microscope 700 which is single. In FIG. 18, an image group of different time ranges in the microscope image group 450 is displayed in two columns.

In step S102 of FIG. 13, the image associating unit 140 accepts designation of the first microscope image 401 and the second microscope image 402 acquired from different time ranges in the microscope image group 450 via the input device 130. That is, in this example, as the first microscope image 401 and the second microscope image 402, microscope images captured at mutually different times are identified. The image associating unit 140 further associates the first microscope image 401 with the second microscope image 402 by the method described with reference to FIGS. 3 to 7. Thus, even in a case where the specimen moves due to the time difference of capturing, the association can be appropriately performed. Note that, instead of the method using the points described in FIGS. 3 to 7, either the method using the pattern matching described in FIG. 14 and FIG. 15 or the method using the setting conditions of the microscope at the time of imaging the microscope image may be used.

Figure 19:
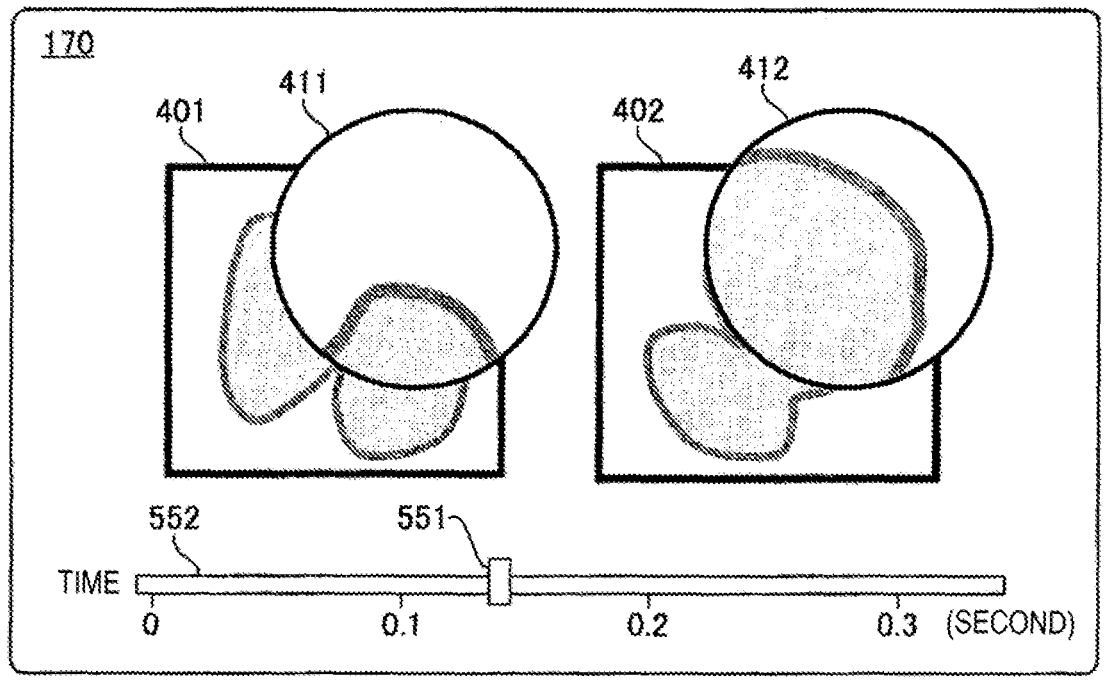
FIG. 19 illustrates a state in which a first magnified image 411 and a second magnified image 412 are displayed on the display 170.

As illustrated in FIG. 19, the image associating unit 140 displays the first microscope image 401 and the second microscope image 402 on the display 170 in step S103 of FIG. 13. In step S104 of FIG. 13, the accepting unit 150 accepts designation of position information to be magnified in the first microscope image 401 via the input device 130.

Further, operations after step S105 of FIG. 13 are performed. Specifically, when the position information from the user is input via the input device 130, the image generator 160 identifies the first magnified region 631 of the first microscope image 401 (S105 of FIG. 13), and generates the first magnified image 411 magnifying the first magnified region 631 in the first microscope image 401 (S109 of FIG. 13).

Further, as described with reference to FIGS. 10 and 11, the image generator 160 identifies the position of the point of the second microscope image 402 corresponding to the position of the point of the first microscope image 401 designated by the user based on the size, the orientation, and the position of each image identified in association between the first microscope image 401 and the second microscope image 402. (S106 of FIG. 13). Further, the image generator 160 generates the second magnified image 412 in which the region including the identified point of the second microscope image 402 is magnified (S107 of FIG. 13).

Further, as described with reference to FIG. 12, the image generator 160 displays the first microscope image 401 and the second microscope image 402, the first magnified image 411, and the second magnified image 412 side by side on the display 170 (S108 of FIG. 13).

The image generator 160 overlaps the first magnified image 411 with the first microscope image 401 and overlaps the second magnified image 412 on the second microscope image 402, and displays the first magnified image 411 and the second magnified image 412 on the display 170 (S108 of FIG. 13). As a result, the first magnified image 411 and the second magnified image 412, which are partial magnified images of the first microscope image 401 and the second microscope image 402, which are selected from the microscope image group 450 generated by the time-lapse imaging at different times, can be displayed on the display 170 and performed comparative observation. Therefore, comparative observation between time-lapse images can be easily performed.

Furthermore, the image generator 160 displays the first microscope image 401 and the second microscope image 402 on the display 170 with the lapse of time. Here, the first magnified image 411 is switched corresponding to the first microscope image 401 to be sequentially displayed. In addition, the second magnified image 412 is also switched in accordance with the second microscope image 402 to be sequentially displayed. As a result, temporal changes of phenomena occurring in the specimen can be efficiently performed comparative observation.

Note that, the image generator 160 accepts switching of the first magnified image 411 and the second magnified image 412 to be displayed on the display 170 from the user by operation of a slider 551. Specifically, the image generator 160 displays on the display 170 a length of time (the time if the length of time indicated by the image group of two columns is the same, either of them if the length of time is different) of the time-lapse imaging indicated by the image group arranged in two columns of FIG. 18 with the length of a bar 552 as illustrated in FIG. 19. The bar 552 indicates a range in which the user accepts a movement of the slider 551. In a case where the operation of the slider 551 via the input device 130 is accepted, the image generator 160 identifies the time corresponding to the position from the position on the bar 552 of the slider 551. The image generator 160 identifies the first microscope image 401 and the second microscope image 402 corresponding to an identified time from each image group, and displays the first magnified image 411 of the identified first microscope image 401 together with the second magnified image 412 of the second microscope image 402. As a result, by operating the slider 551, the user can observe the temporal change of each of the first magnified image 411 and the second magnified image 412, and the efficiency of comparative observation can be further improved.

Note that, in the present example, a microscope image acquired by time-lapse imaging with a single microscope is used, but instead of this, a microscope image may be acquired by time-lapse imaging from a plurality of microscopes respectively, and these microscope images may be arranged in an order in which they were imaged, such that a time-lapse captured microscope image may be acquired.

In addition, in the aforementioned example, as the microscope image group 450, the first microscope image 401 and the second microscope image 402 have been acquired from an image acquired by observing one specimen in chronological order. However, the first microscope image 401 and the second microscope image 402 may not be included in the microscope image group captured during a continuous passage of time. For example, the first microscope image 401 may be selected from a microscope image group captured with the lapse of time by applying a reagent A to the specimen, and then the second microscope image 402 may be selected from a microscope image group captured with the lapse of time by applying a reagent B to the specimen for the same specimen. In addition, the first microscope image 401 and the second microscope image 402 may be selected from each microscope image group captured the respective specimens with the lapse of time by applying the same reagent for different specimens.

Figure 20:
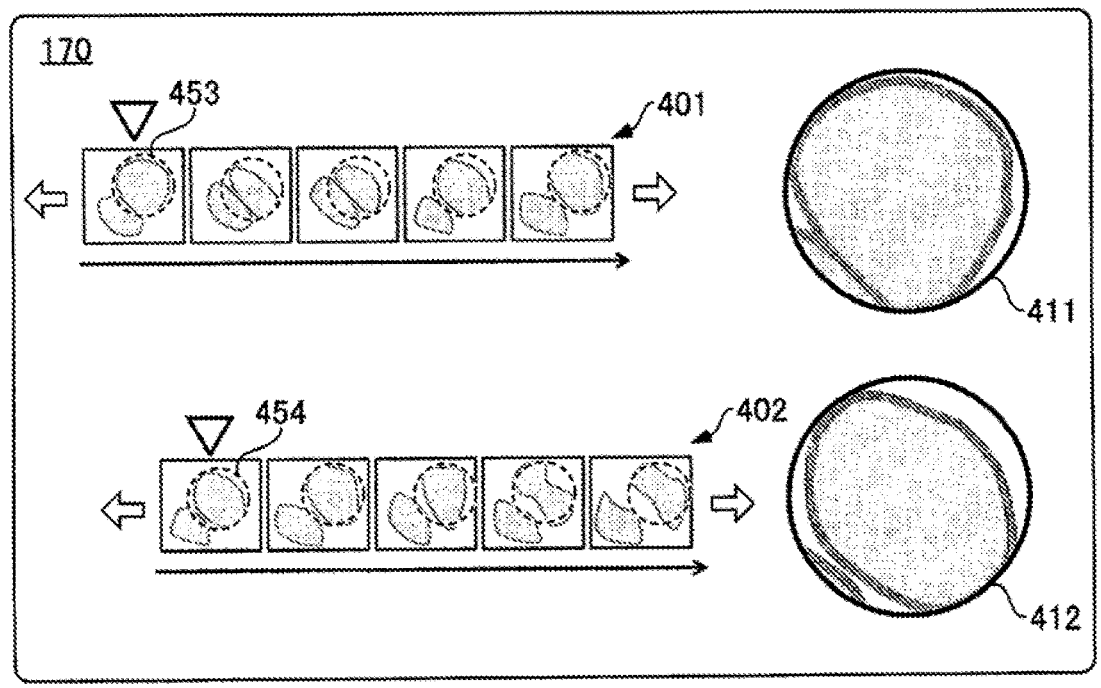
FIG. 20 is a diagram for describing another example using a time-lapse image.

Note that, as described with reference to FIG. 17, the slider 551 of FIG. 19 can be used in a case where the user designates the first microscope image 401 and the second microscope image 402 from the images acquired by cutting out a plurality of planes in the three dimensional microscope image data, and these microscope images are displayed on the display 170 image generator 160. In this case, the accepting unit 150 stores the position of the slider 551 in association with the position of the plane to be cut out of the three dimensional microscope image data. In a case where the input of the position of the slider 551 is accepted from the user via the input device 130, the accepting unit 150 identifies the position of the plane to be cut out of the three dimensional microscope image data from the position of the accepted slider 551 and outputs the position to the image generator 160, and the image generator 160 displays the plane microscope image on the plane on the display 170, FIG. 20 is a diagram for describing another example using a time-lapse image, With respect to the time-lapse image described with reference to FIGS. 18 and 19, there are cases where the position or region that the user is focused may move. Therefore, in this example, a position where a designation is accepted for magnifying in the first microscope image 401 has moved to which position in each of the first microscope image 401 and the second microscope image 402 captured later is detected. In this case, the pattern matching described in FIGS. 14 and 15 can be used.

In this case, in step S101 of FIG. 13, the image associating unit 140 acquires the microscope image group time-lapse captured by the single microscope 700. The image associating unit 140 accepts designation of the first microscope image 401 and the second microscope image 402 acquired from different time ranges in the microscope image group via the input device 130.

Further, in the present embodiment, the image processor 101 operates in the following manner instead of steps S102 to S107 of FIG. 13. The accepting unit 150 accepts designation of the position of the first microscope image 401 which is considered to be focus by the user from the input device 130 and the image associating unit 140 identifies a region 453 including the position. By using the region 453, the image corresponding unit 140 performs pattern matching with a plurality of first microscope images 401 at a later time than the first microscope image 401 currently displayed. As a result, the image associating unit 140 magnifies each of the regions detected as having a high similarity to the region 453 in the plurality of first microscope images 401 at a time later than the first microscope image 401, and generates a plurality of first magnified images 411.

By using the region 453, the image associating unit 140 further performs pattern matching with the second microscope image 402 currently displayed and a plurality of second microscope images 402 at a later time, and associates the first microscope image 401 with the second microscope image 402. Accordingly, the image associating unit 140 magnifies each of regions 454 detected as having a high similarity to the region 453 in the plurality of second microscope images 402, and generates a plurality of second magnified images 412.

As illustrated in FIG. 20, the image generator 160 displays the first magnified image 411 and the second magnified image on the display 170 with the lapse of time. As a result, even if the position or region the user is focused is moving in the time-lapse image, the magnified image in which the position or region is magnified can be easily compared.

Note that, in the example described with reference to FIGS. 19 and 20, only the second microscope image 402 and the second Magnified image 412 may be displayed with the lapse of time without changing the first microscope image 401 and the first magnified image 411.

Figure 21:
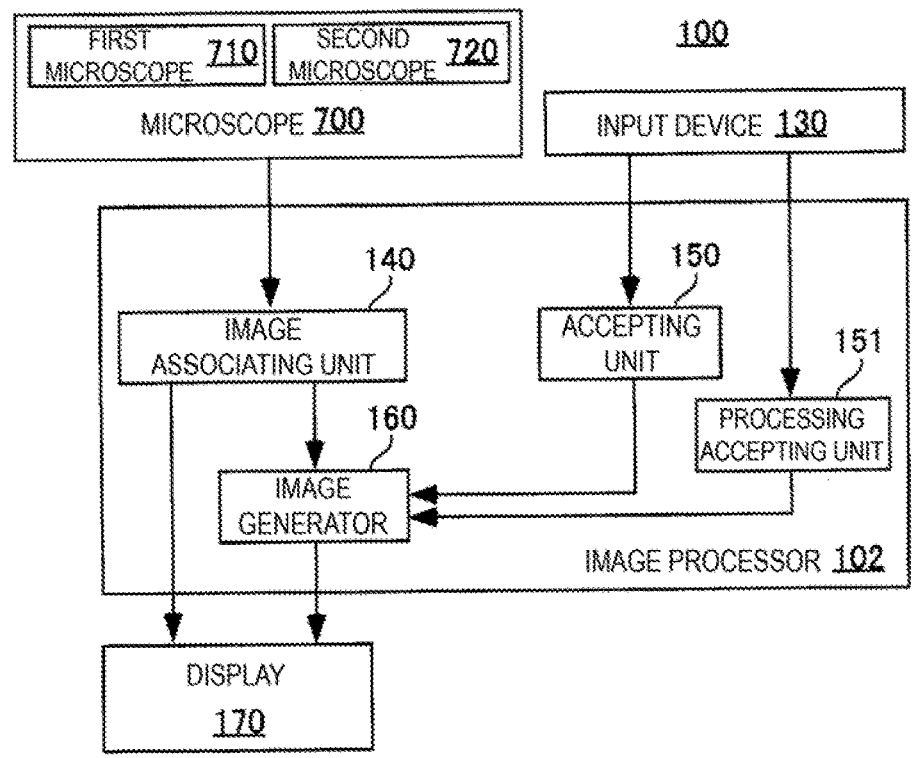
FIG. 21 is a block diagram of a microscope system 100 including another image processor 102.

FIG. 21 is a block diagram of the microscope system 100 including another image processor 102. The image processor 102 has the same structure as the image processor 101 illustrated in FIG. 1 except for a part to be described next. Elements common to the image processor 101 are denoted by the same reference numerals, and redundant description is omitted.

The image processor 102 is different from the image processor 101 in that the image processor 102 includes a processing accepting unit 151 that accepts a display condition input from the input device 130 in addition to the accepting unit 150 that accepts the position designated by the input device 130. The display condition is a condition in which the first magnified image 411 once generated is image processed to change the display on the display 170. The display condition includes a range magnified by the first magnified image 411, an image magnification, an image brightness, an image contrast, an image rotation, and an image reversal.

Figure 22:
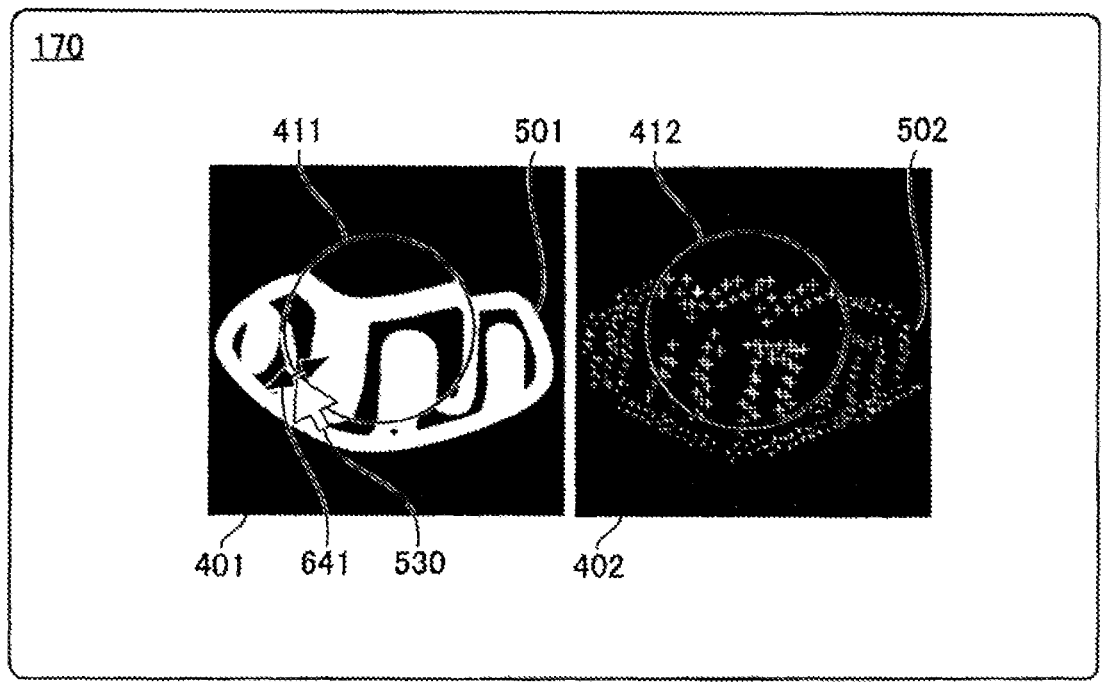
FIG. 22 is a diagram for describing a case where a range magnified by the first magnified image 411 is designated as a display condition.

FIG. 22 is a diagram for describing a case where the range magnified by the first magnified image 411 is identified as a display condition. The user identifies the changed size by dragging the contour of the first magnified image 411 with the cursor 530 with respect to the first magnified image 411 displayed on the display 170. By dragging the cursor 530 outward in a radial direction of the first magnified image 411 as illustrated by an arrow 641 of FIG. 22, the user can instruct to magnify the display region of the first magnified image 411. In addition, the user determines the size of the first magnified image 411 after the image processing by releasing the drag at a desired position.

Figure 23:
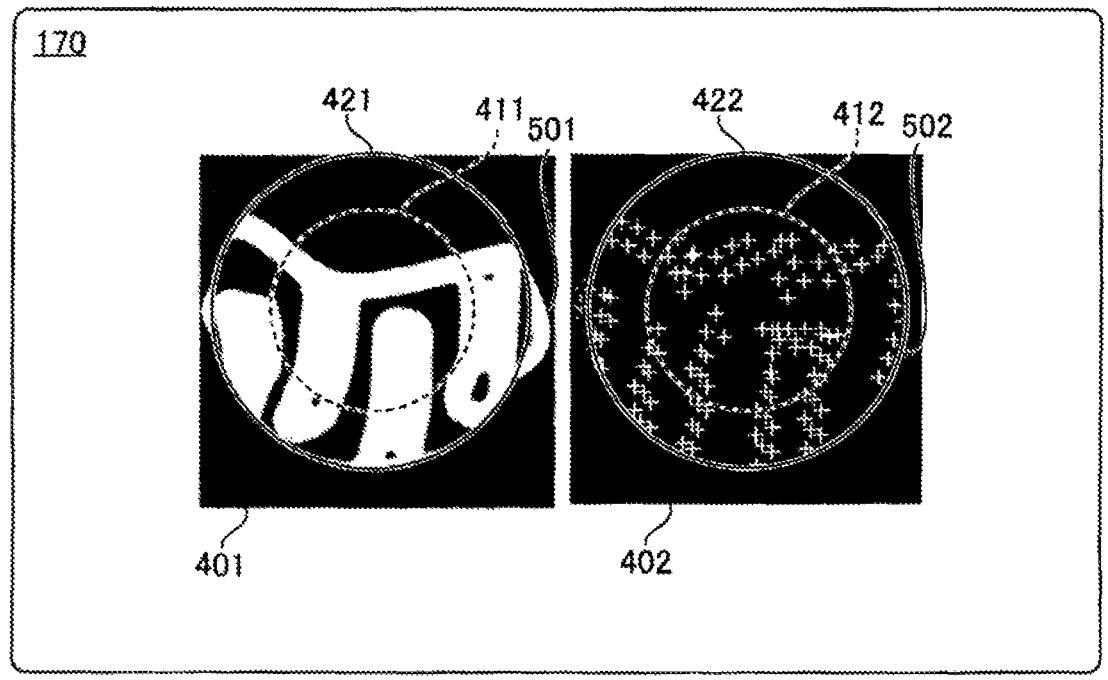
FIG. 23 is a diagram for describing a processing following FIG. 22.

FIG. 23 is a diagram for describing the process following FIG. 22. Based on the size of the first magnified image 411 accepted by the processing accepting unit 151, the image generator 160 magnifies the original first magnified image 411 to the range of a first magnified image 421 corresponding to the magnified display range. Accordingly, the image processor 102 magnifies the original second magnified image 412 to the same size as the magnified first magnified image 421 to generate a magnified second magnified image 422. In this case, the first microscope image 401 and the second microscope image 402 have the same size, orientation, and position, thus' the first microscope image 401 (specimen image) and the second microscope image 402 (specimen image) are magnified in the same position, the same magnification, and the same range. As a result, the magnified first magnified image 421 and the magnified second magnified image 422 are juxtaposed.

Figure 24:
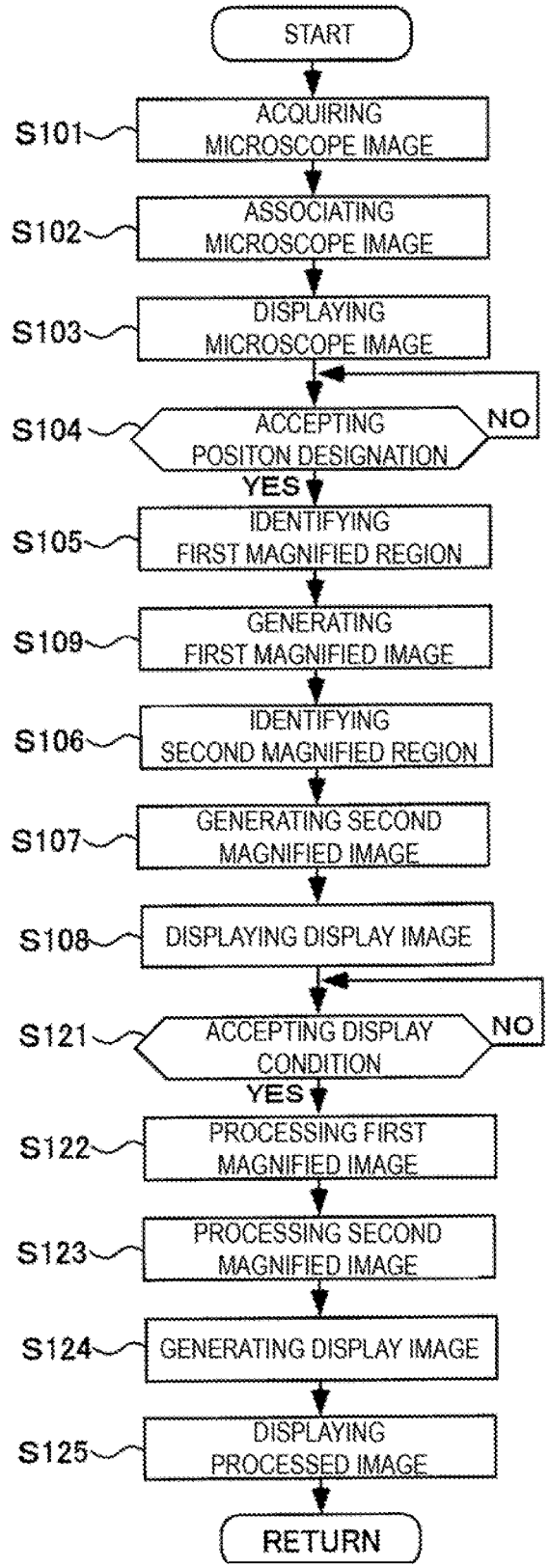
FIG. 24 is a flowchart illustrating a performing procedure of processing in the image processor 102.

FIG. 24 is a flowchart illustrating a performing procedure of processing in the image processor 102. In the procedure of FIG. 24, steps S101 to S108 are the same as those of FIG. 13.

In a state in which the first microscope image 401, the second microscope image 402, the first magnified image 411, and the second magnified image 412 are displayed on the display 170, a process accepting unit 151 accepts the presence or absence of input of the display condition in this state (S121).

In a case where the process accepting unit 151 accepts the display condition (S121: YES), the image generator 160 performs image processing under the display condition with respect to the first magnified image 411 (S122). Also, the image generator 160 reflects and performs the image processing performed to the first magnified image 411 on the second magnified image 412 generated corresponding to the first magnified image 411 (8123).

Subsequently, the image generator 160 generates the first magnified image 421 and the second magnified image 422 after the image processing (8124), and causes the display 170 to display them (S125). Therefore, the process performed in the case where the process accepting unit 151 accepts the display condition is completed.

As a result, the image processor 102 can further process the first magnified image 411 and the second magnified image 412 according to the input display conditions after the processing by the image generator 160 is temporarily completed. Therefore, the first magnified image 411 and the second magnified image 412 after the processing displayed on the display 170 can be easily observed, and the efficiency of comparison and observation can be further improved.

Further, in the case where the display condition for the first magnified image 411 is input, the image processor 102 performs image processing with respect to the second magnified image 412 as the same as that with respect to the first magnified image 411. Therefore, the time and effort of designating the display conditions for each of the first magnified image 411 and the second magnified image 412 can be reduced, thus both of the first magnified image 411 and the second magnified image 412 can be efficiently performed comparative observation.

Note that, the designation method in the case where the display condition is designated in the aforementioned step S121 is not limited to the method of operating the movement of the cursor on the first magnified image 411. For example, a menu enumerating types of image processing and values of parameters as options may be displayed, and the contents instructed by the menu may be selected. Further, for example, in a case of designating the display region of the magnified image, an actual size of the specimen may be designated by a numerical value, or may be designated by the number of pixels on the display 170, the magnification relative to the size of the original region, or the like. Alternatively, the display condition may be selected from a plurality of first magnified images 411 having different sizes which are displayed.

In step S121 of FIG. 24, the process accepting unit 151 may accept a display condition other than the range magnified by the first magnified image 411 described with reference to FIG. 23 as the display condition. For example, when the process accepting unit 151 accepts the rotation of the first magnified image 411 as the display condition, the image generator 160 rotates the first magnified image 411 to overlap the first microscope image 401. Similarly, the image generator 160 also rotates the second magnified image 412 to overlap the second microscope image 402. In this case, since the first microscope image 401 and the second microscope image 402 are matched in the size, orientation, and position of the image, the image generator 160 may rotate the second magnified image 412 by the same angle as the first magnified image 411.

In step S121 of FIG. 24, the process accepting unit 151 may further accept the magnification of the image, the brightness of the image, the contrast of the image, and the reversal of the image as other display conditions. In a case where any of the display conditions is accepted, the image generator 160 generates the first magnified image 411 and the second magnified image 412 after the image processing under the display condition, and displays the first magnified image 411 and the second magnified image 412 on the display 170 to overlap them with the first microscope image 401 and the second microscope image 402 respectively. Therefore, the time and effort of designating the processes for each of the first magnified image 411 and the second magnified image 412 can be reduced, thus both of them can be efficiently performed comparative observation.

Instead of step S121 of FIG. 24, the accepting unit 150 may accept an instruction to move the first magnified image 411. In a case where the user moves by dragging the first magnified image 411 on the display 170 via the input device 130, the accepting unit 150 accepts the movement and outputs a moving direction and a moving amount to the image generator 160. The image generator 160 moves the first magnified region 631 within the first microscope image 401 by the moving direction and the moving amount accepted by the accepting unit 150, and generates the first magnified image 411 by magnifying the first magnified region 631 after the movement. Further, the image generator 160 moves the second magnified region 632 within the second microscope image 402 by the moving direction and the moving amount accepted by the accepting unit 150, and generates the second magnified image 412 by magnifying the second magnified region 632 after the movement. The image generator 160 displays the first magnified image 411 and the second magnified image 412 on the display 170. Therefore, in the display 170, the second magnified image 412 is moved and displayed in synchronization of the movement of the first magnified image 411. The second magnified image 412 also moves together with the instruction to move with respect to the first magnified image 411, thus, the user can move the first magnified image 411 and the second magnified image 412 to a place that the user can easily see, and can perform comparative observation of both the first magnified image 411 and the second magnified image 412 easily.

Instead of the step S121 of FIG. 24, the process accepting unit 151 may accept a change of the position at which the first magnified image 411 is displayed. In a case where the user moves by dragging the first magnified image 411 on the display 170 via the input device 130, the process accepting unit 151 accepts the movement and outputs the moving direction and the moving amount to the image generator 160. The image generator 160 displays the first magnified image 411 at the moved position by the moving direction and the moving amount accepted by the processing accepting unit 151 and displays the second magnified image 412 at the position moved by the same moving direction and the moving amount. Therefore, in the display 170, the second magnified image 412 is moved and displayed in synchronization with the movement of the first magnified image 411. The second magnified image 412 also moves together with the instruction to move with respect to the first magnified image 411, thus, the user can move the first magnified image 411 and the second magnified image 412 to a place that the user can easily see so as to perform comparative observation of both the first magnified image 411 and the second magnified image 412 easily.

Figure 25:
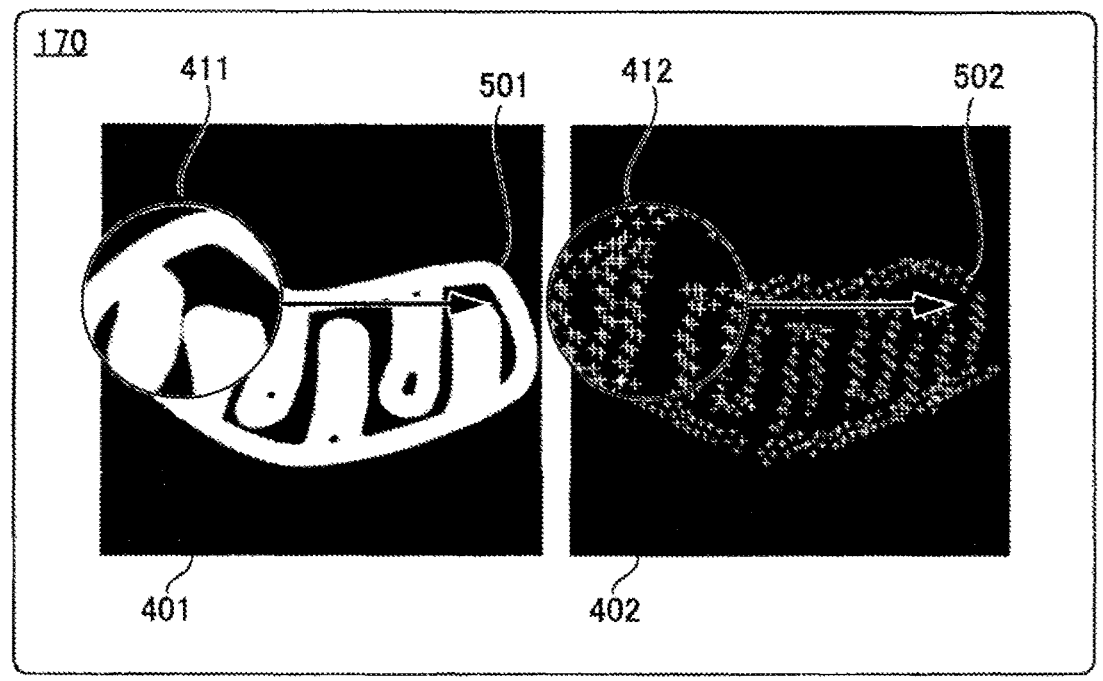
FIG. 25 is a diagram for describing a processing of accepting scanning on a first microscope image 401 and a second microscope image 402.
Figure 26:
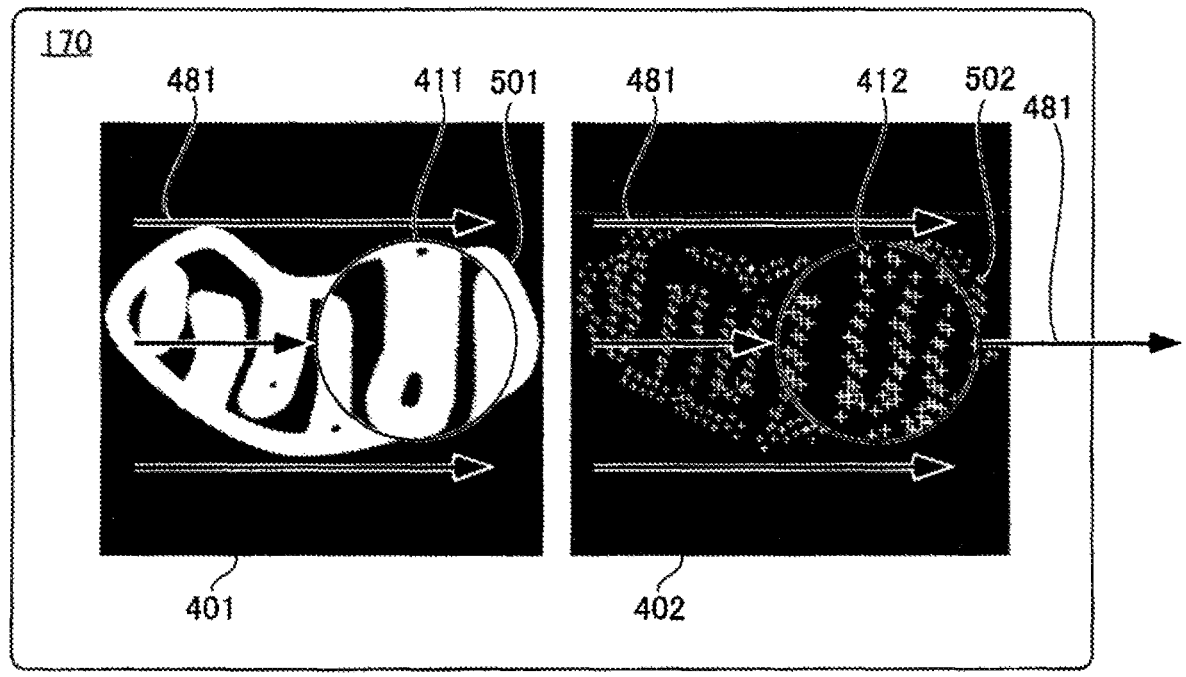
FIG. 26 is a diagram for describing the process of accepting scanning on the first microscope image 401 and the second microscope image 402.

FIGS. 25 and 26 are diagrams for describing the process of accepting a scanning on the first microscope image 401 and the second microscope image 402 instead of accepting the display conditions in step S121 of FIG. 24.

In this example, when performing comparative observation of the first magnified image 411 and the second magnified image 412, the user can instruct the process accepting unit 151 for the scanning mode. In the scanning mode, a starting position of scanning, a scanning direction and an end position of scanning are set by default, but they may be designated by the user via the input device 130.

In the scanning mode, the image generator 160 scans the first microscope image 401 along the scanning direction from the start point of the first microscope image 401, sequentially generates and displays the first magnified image 411 including the scanning position.

FIG. 25 illustrates the first magnified image 411 and the second magnified image at the start point, and FIG. 26 illustrates the first magnified image 411 and the second magnified image during the scanning. The image generator 160 sequentially generates and displays the second magnified image 412 at the corresponding position in the second microscope image 402 in synchronization with the scanning of the first microscope image 401.

Therefore, the first magnified image 411 and the second magnified image 412 gradually descend on the first microscope image 401 and the second microscope image 402 while repeating movement horizontally in the same direction in synchronism with each other. With this scanning mode, the image processor 102 improves the efficiency of comprehensive comparative observation in the first microscope image 401 and the second microscope image 402.

In addition, the scanning mode described with reference to FIGS. 25 and 26 can be used for comparative observation of specimens of a plurality of wells which are two-dimensionally arranged in a well plate. For the plurality of wells, the amount, concentration, type of drug to be given to the specimen, elapsed time since administration of drugs, and the like, are made different from each other.

In this case, first, the image associating unit 140 acquires the first microscope image 401 acquired by imaging a specimen of an identified well, and a plurality of the second Microscope images 402 acquired by imaging the plurality of wells different from the identified well. The accepting unit 150 accepts designation of the position of a point to be magnified in the first microscope image 401, and the image generator 160 generates the first magnified image 411 by magnifying a region including the point of the first microscope image 401. Note that, as described in the example of FIG. 10, the accepting unit 150 may accept designation of the position of the region of the first microscope image 401 instead of designating the position of the point of the first microscope image 401.

The image generator 160 identifies points in each of the plurality of the second microscope images 402 corresponding to the point at which the designation has been accepted by the accepting unit 150 in the first microscope image 401. Specifically, the image generator 160 identifies a point (position coordinate in the second microscope image 402) in the second microscope image 402, wherein the position of the point is the same as the position (the position coordinate in the first microscope image 401) of the point at which the designation has been accepted in the first microscope image 401. The image generator 160 further generates a plurality of the second magnified images 412 magnifying a region including the points of the plurality of the second microscope images 402, and sequentially displays the plurality of the second magnified images 412 together with the first magnified image 411 on the display 170. Instead of identifying the point in the second microscope image 402 wherein the position of the point is the same as the position of the point at which the designation has been accepted in the first microscope image 401, for the first microscope image 401 and each of the plurality of the second microscope images 402, the position at which the second magnified image 412 is generated may be identified for each of the plurality of second microscope images 402 by using the pattern matching described with reference to FIGS. 14 and 15.

In a case where the plurality of the second magnified images 412 are sequentially displayed, the image generator 160 identifies a start position of scanning, a scanning direction, and an end position of scanning, based on the input from the user or the default setting, and sequentially displays the second magnified image 412 of a well corresponding to the scanning position, similarly to the description with reference to FIGS. 25 and 26. As a result, the specimens of the plurality of wells in which the amount, concentration, type of drug to be given, elapsed time since administration of the drug, and the like are mutually can be performed comparative observation easily.

Figure 27:
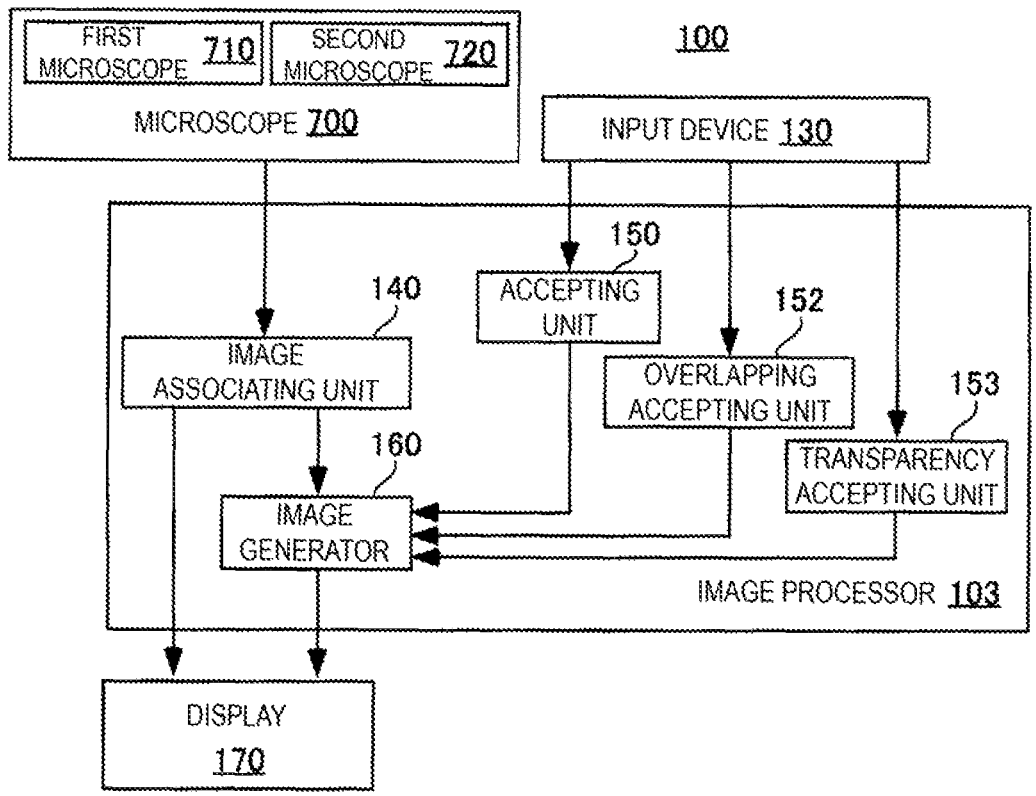
FIG. 27 is a block diagram of another image processor 103.

FIG. 27 is a block diagram of another image processor 103. The image processor 103 has the same configuration as the image processor 101 illustrated in FIG. 1, except for a part to be described next. Thus; the same reference numerals are attached to common configurations and redundant description is omitted.

The image processor 103 further includes a transparency accepting unit 152 and an overlap accepting unit 153 that accept instructions from the input device 130, The transparency accepting unit 152 accepts an instruction of transparency from the user input via the input device 130. The overlap accepting unit 153 accepts an instruction of overlapping the images from the user input via the input device 130.

Figure 28:
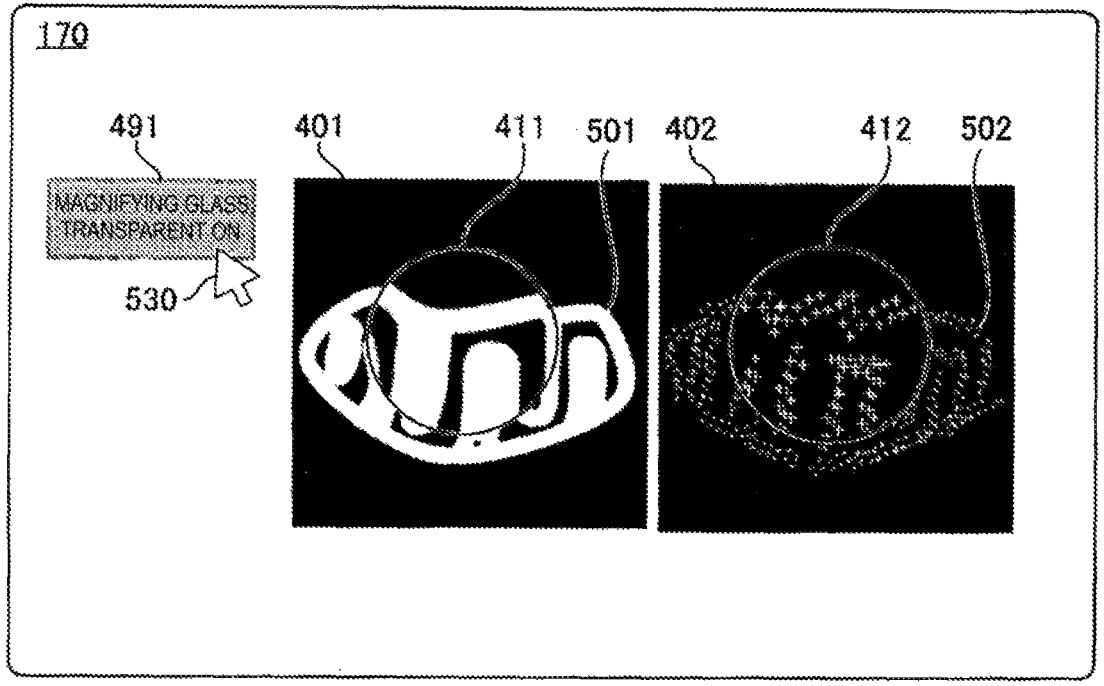
FIG. 28 is a diagram for describing a processing of the image processor 103.

FIG. 28 is a diagram illustrating processing of the image processor 103. Before entering the instruction of transparency, the image corresponding unit 140 displays on the display 170. In FIG. 28, the first magnified image 411 and the second magnified image 412 are displayed to respectively overlap with the first microscope image 401 and the second microscope image 402. In FIG. 28, a button 491 for supporting transparency is further displayed.

When the instruction of transparency by the button 491 is accepted, the image generator 160, which has acquired the instruction through the transparency accepting unit 152, causes the cursor 530 operated by a pointing device such as a mouse to select which of the first magnified image 411 and the second magnified image 412 is to be made transparent. In the illustrated example, the first magnified image 411 is selected and made transparent.

Here, the transparency means that the content of the first magnified image 411 is understood and translucent to such a degree that the background can be seen through, and the first magnified image 411 is not lost. Further, the image processor 103 displays a slider 551 for adjusting a transmittance of the display 170 such that the user can set the transmittance.

In a case where the user inputs an instruction of overlapping via the input device 130, the overlap accepting unit 153 accepts the instruction. In a case where the overlap accepting unit 153 accepts the instruction of overlapping, the image generator 160 performs an overlapping process of generating an overlapped image 414 acquired by overlapping the first magnified image 411 with the second magnified image 412.

In a case where the user moves the first magnified image 411 by dragging the cursor 530 on the first magnified image 411 and overlaps the first magnified image 411 on the second magnified image 412, the overlap accepting unit 153 determines that there is an instruction of overlapping. Instead of moving the first magnified image 411 by dragging, the instruction of overlapping may be accepted by a button, a menu item, or the like. In a case where the instruction of overlapping is accepted by a button, a menu item, or the like, an overlapped image may be displayed on one position of the first magnified image 411 and the second magnified image 412, or the overlapped image may be displayed at a position different from any position of the first magnified image 411 and the second magnified image 412.

Figure 29:
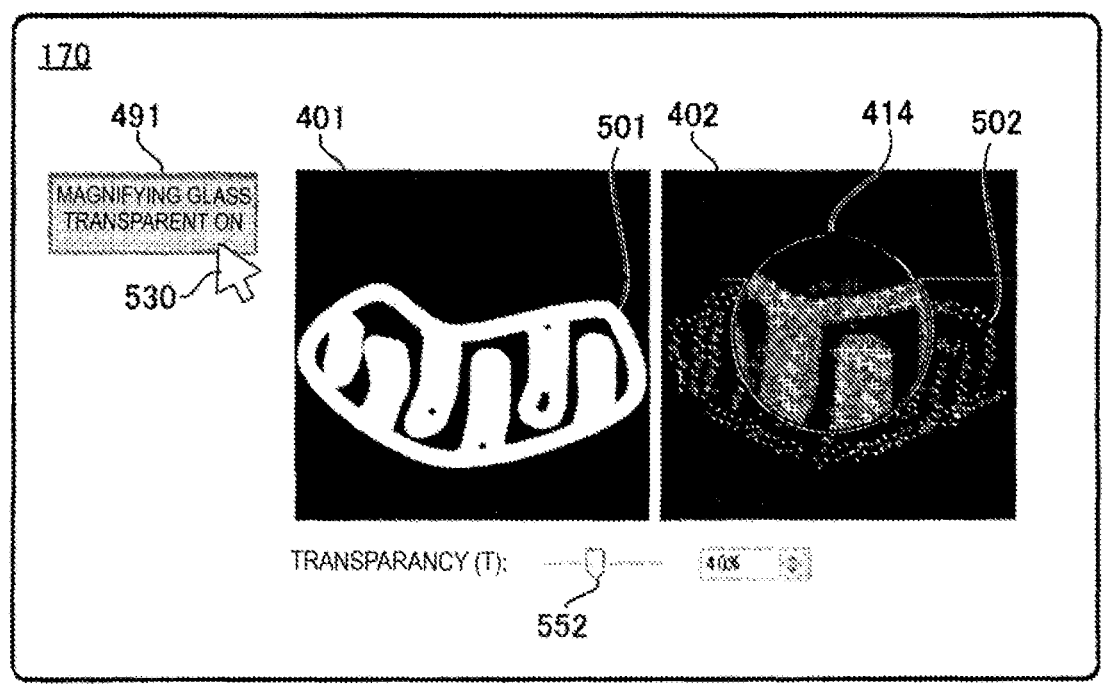
FIG. 29 illustrates a state in which a magnified image 414 is displayed.

FIG. 29 illustrates a state in which the overlapped image 414 is displayed. For a region where the first magnified image 411 and the second magnified image 412 overlap each other, the image generator 160 performs the overlapping process with the first magnified image 411, which has been made transparent previously, as an upper layer and the second magnified image 412, which is not transparent, as a background, Thereby, it is easy to grasp the difference between the first magnified image 411 and the second magnified image 412. Therefore, the efficiency of comparison and observation between the first microscope image 401 and the second microscope image 402 is improved. In addition, the image generator 160 may exchange the magnified image to be transparent and the magnified image to be the background in accordance with an instruction from the user.

Further, in generating the overlapped image 414, one image of the first magnified image 411 and the second magnified image 412 may be subjected to image processing to have a different color, brightness, or the like from that of the other image. For example, in a case where one image of the first magnified image 411 and the second magnified image 412 is subjected to image processing to have a different color from the other image, one image of the first magnified image 411 and the second magnified image 412 may be subjected to image processing to have a different color tone from the other image. This makes it easier to compare the first magnified image 411 and the second magnified image.

Figure 30:
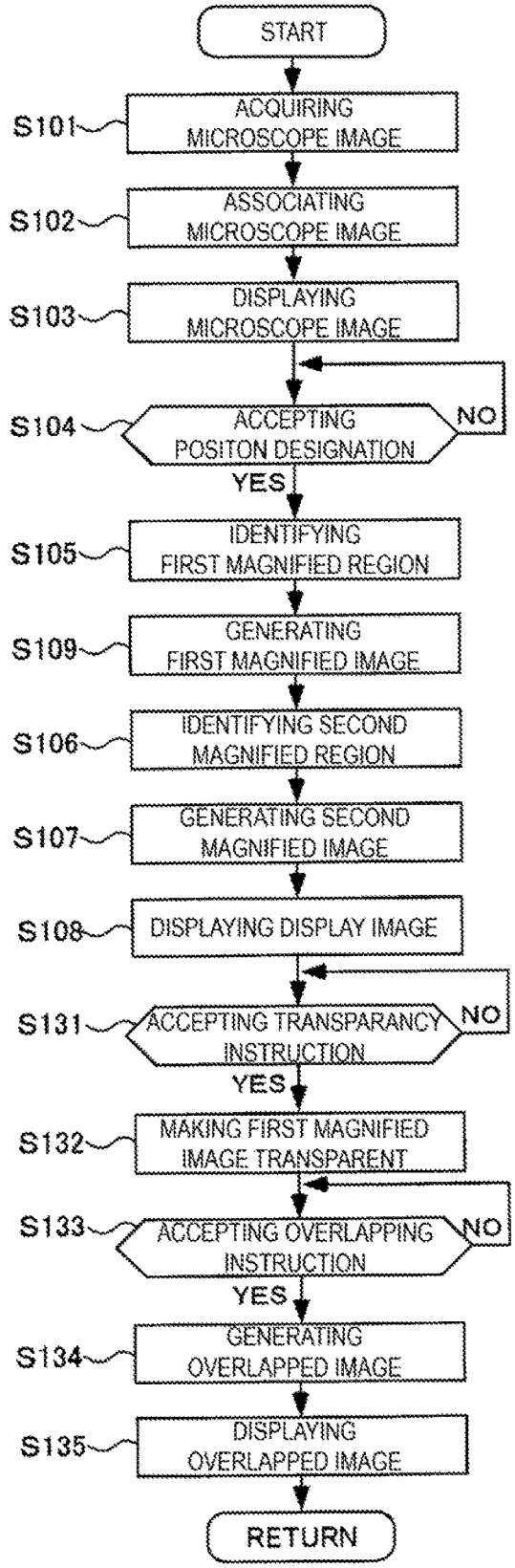
FIG. 30 is a flowchart illustrating an operation procedure of the image processor 103.

FIG. 30 is a flowchart illustrating an operation procedure of the image processor 103. Since steps S101 to S108 in the procedure of FIG. 30 are the same as those of FIG. 13, description thereof will be omitted.

In a state where the first microscope image 401, the second microscope image 402, the first magnified image 411, and the second magnified image 412 are displayed on the display 170, the transparency accepting unit 152 accepts the instruction of transparency in this state (S131).

Next, when the transparency accepting unit 152 accepts the instruction of transparency (S131: YES), the image generator 160 performs transparency to the first magnified image 411, for example (S132). Next, the overlap accepting unit 153 stands by while monitoring whether there is an instruction of overlapping (S133: NO).

When the overlap accepting unit 153 accepts an instruction of overlapping (S133) (S133: YES), the image generator 160 generates the overlapped image 414 by superimposing the first magnified image 411 and the second magnified image 412 (S134). The image generator 160 overlaps the generated overlapped image 414 on the second microscope image 402 and displays on the display 170 (S135). Thus, the image processing by the image processor 103 is completed.

Figure 31:
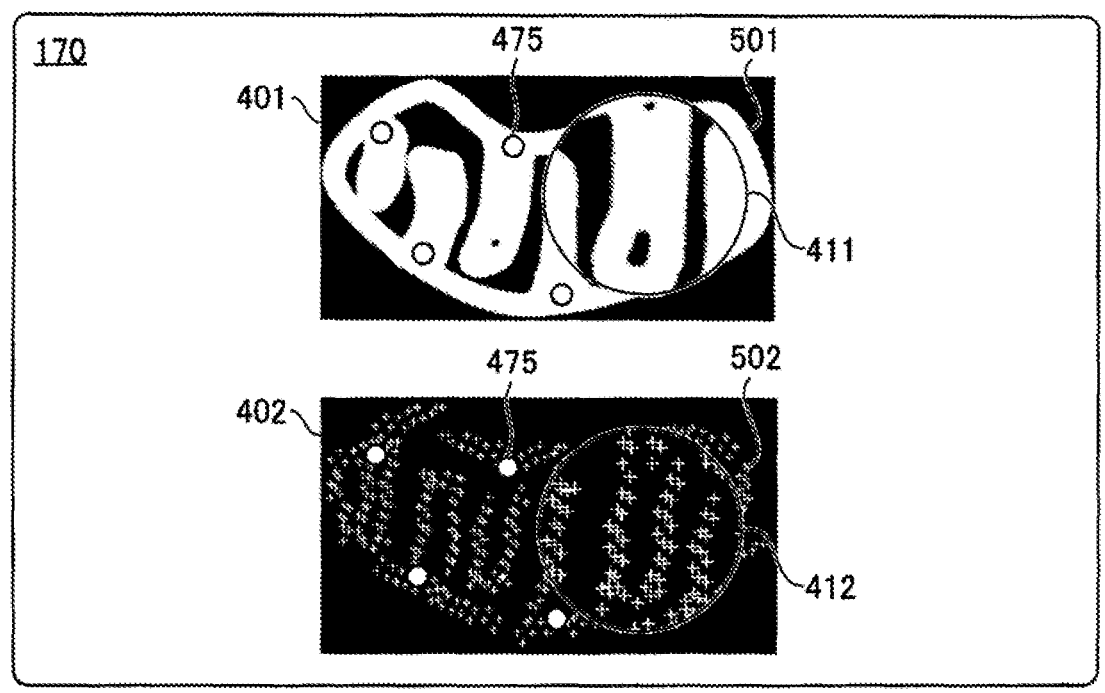
FIG. 31 is a diagram for describing still another operation of the image processor 101.

FIG. 31 is a diagram for describing still another operation of the image processor 101. In FIG. 31, the first microscope image 401, the second microscope image 402, the first magnified image 411, and the second magnified image 412 are displayed as in FIG. 12.

In FIG. 31, each time there is a new designation of the position to be magnified from the user, steps S105 to S108 of FIG. 13 are repeated to display the first magnified image 411 and the second magnified image 412 corresponding to the position on the display 170. As a result, the user sequentially observes the first magnified image 411 and the second magnified image 412, and thereafter, it may be desired to observe the first magnified image 411 and the second magnified image 412 for an identified position that was previously performed comparative observation. Therefore, each time the accepting unit 150 accepts the designation of the position in step S104 of FIG. 13, steps S105 to S108 are performed, and the image generator 160 displays the first magnified image 411 and the second magnified image 412 on the display 170, and displays markers 475 at respective positions of the first microscope image 401. The first magnified image 411 and the second magnified image 412 in association with the respective positions are stored in the image processor 101.

Next, when any one of the markers 475 is designated by the user, the image generator 160 displays the first magnified image 411 and the second magnified image 412 stored at the position corresponding to the marker 475 on the display 170. Note that, the image generator 160 may automatically sequentially display the first magnified image 411 and the second magnified image 412 for a plurality of the markers 475 based on an instruction from the user. Note that the markers 475 may be displayed at a point in the second microscope image 402 corresponding to a point designated by the user in the first microscope image 401, or may be displayed in both the first microscope image 401 and the second microscope image 402.

According to the present example, the markers 475 can be left during the operation of comparing the magnified images, thus the comparative observation of the magnified images can be performed without labor hour when the previously magnified position is desired to be newly observed later. Therefore, the comparative observation of the first microscope image 401 and the second microscope image 402 can be easily performed.

Note that, in any of the aforementioned examples and modifications, the image generator 160 may separately display the first magnified image 411 on the display 170 without overlapping the first magnified image 411 on the first microscope image 401, and may separately display the second magnified image 412 on the display 170 without overlapping on the second microscope image 402. Further, even in a case where the first magnified image 411 overlaps the first microscope image 401, the image generator 160 may overlap the first magnified image 411 at a position different from the position designated to be magnified in the first microscope image 401. Similarly, even in a case where the second magnified image 412 overlaps the second microscope image 402, the image generator 160 may overlap the second magnified image 412 at a position different from the position designated to be magnified in the second microscope image 402.

In addition, in any of the aforementioned examples and modifications, an image acquired by another microscopy may be used as the first microscope image 401 and the second microscope image 402 instead of the first microscope image 401 and the second microscope image 402 acquired by SIM, STORM, and electron microscope. For example, a microscope image generated by a three dimensional fluorescence microscope, an epifluorescence microscope, a confocal microscope, a STimulated Emission Depletion (STED) microscope, Photo Activated Localization Microscopy (PALM), Expansion Microscopy, an atomic force microscope or the like may be used. Further, images processed under mutually different conditions using the same microscopy may be used as the first microscope image 401 and the second microscope image. In this case, in the SIM, the super-resolution images having mutually different conditions set at the time of reconstruction may be used as the first microscope image and the second microscope image.

Even in a case where an image acquired by any of the microscopies is used, the image associating unit 140 may associate the first microscope image 401 and the second microscope image 402 using any of a method of associating the microscope images described with reference to FIGS. 3 to 7, a method of associating the microscope images described with reference to FIGS. 14 and 15, and a method using a setting condition of a microscope at the time of imaging of the microscope image. Further, in any of the examples and the modifications, the first microscope image 401 and the second microscope image 402 may be images acquired by capturing images of specimens of the same type and specimens of different individuals or different types of specimens.

Note that, in any of the aforementioned examples and modifications, at least part of the first microscope image 401 designated by the accepting unit 150 and at least part of the second microscope image 402 corresponding to the part of the first microscope image 401 may not be the same position. Specifically, the point in the first microscope image 401 accepted by the accepting unit 150 and the point in the second microscope image 402 identified by the image generator 160 may not at the same position on the microscope image. For example, when comparing and observing a first magnified image acquired by magnifying a region including a point in the first microscope image 401 accepted by the accepting unit 150 and a second magnified image acquired by magnifying a region including a point in the second microscope image 402 identified by the image generator 160, the point in the first microscope image 401 that has been designated and the point in the second microscope image 402 identified by the image generator 160 may be separated from each other on the microscope image to such a range that there is no problem in comparison.

In any of the aforementioned examples and modifications, the image generator 160 may perform intensity conversion that distributes intensity values of the first magnified image 411 and the second magnified image 412 in a specific range. It is preferable that the image generator 160 performs the intensity conversion separately such that the distribution of brightness is suitable for the first magnified image 411 and the second magnified image 412 respectively. For example, in a case where the intensity value in the first magnified image 411 (in other words, the intensity value of each pixel of the first magnified image 411) is concentrated and distributed in a low (dark) side of 256 gradations, the image generator 160 performs intensity conversion such that the distribution spreads over the entire 256 gradations. Specifically, the intensity of each pixel is converted such that the intensity value of a pixel having a high intensity value among the intensity values of each pixel of the first magnified image 411 becomes higher (brighter). On the other hand, for example, in a case where the intensity value in the second magnified image 412 (in other words, the intensity value of each pixel of the second magnified image 412) is concentrated and distributed on a high (bright) side of 256 gradations, the image generator 160 converts the intensity of each pixel such that the intensity value of the pixel having a low intensity value becomes lower (darker) among the pixels of the second magnified image 412, as the distribution spreads over the entire 256 gradations. As a result, a difference in intensity which has not been seen before appears in the first magnified image 411 and the second magnified image 412, and an image of a micro structure of the specimen can be observed. The intensity is separately converted such that the distribution of brightness is suitable for the first magnified image 411 and the second magnified image 412, thus comparative observation of both the first magnified image 411 and the second magnified image 412 can be facilitated. In this case, a known Look-Up Table (LUT) or the like in which the relationship between the intensity value before conversion and the intensity value after conversion is described is used.

Note that, the second magnified image 412 is a magnified image by magnifying the position of the second microscope image 402 corresponding to the position designated to be magnified in the first microscope image 401, at which the first magnified image 411 is generated, thus it can be said that the second magnified image 412 is related to the first magnified image 411. However, the second magnified image 412 generated in association with the first magnified image 411 by the image generator 160 is not limited to the case that the positions of the points correspond to each other, as long as they have some association.

While the embodiments of the present disclosure have been described, the technical scope of the present disclosure is not limited to the aforementioned embodiments. It is apparent to persons skilled in the art that various alterations and improvements can be added to the aforementioned embodiments. It is also apparent from the scope of the claims that the embodiments added with such alterations or improvements can be included in the technical scope of the present disclosure.

In the device, system, program, and method disclosed in the claims, the description, and the drawings, it should be noticed that the order of execution of each of the processes such as the operation, procedures, steps, and stages is not explicitly described as "before", "prior to", or the like, and can be realized in any order as long as the output of the previous process is used in subsequent processing. The terms "first", "next", and the like are used with respect to the operation flow in the claims, the specification, and the drawings for the sake of convenience, but do not means that it is implemented to perform in this order.

The invention claimed is:

1. An image processor, comprising:
   an accepting unit configured to accept designation in at least part of a first microscope image; and
   an image generator configured to generate image data for displaying, on a display, a first magnified image in which a first region in the at least part of the first microscope image is magnified based on the designation, a second magnified image in which a second region of a second microscope image related to the first region in the at least part of the first microscope image is magnified, the first microscope image and the second microscope image.

2. The image processor according to claim 1, wherein the first microscope image and the second microscope image include images based on mutually different microscopies.

3. The image processor according to claim 1, wherein the first microscope image and the second microscope image include images in mutually different focal planes.

4. The image processor according to claim 1, wherein the first microscope image and the second microscope image include images including observation objects processed under mutually different processing conditions.

5. The image processor according to claim 1, wherein the first microscope image and the second microscope image both include images acquired by a structured illumination microscope, and the first microscope image and the second microscope image include images generated under mutually different conditions.

6. The image processor according to claim 1, wherein the first microscope image and the second microscope image include images captured at mutually different times.

7. The image processor according to claim 6, wherein the first microscope image includes an image group of a first time range captured with the lapse of time, the second microscope image includes an image group of a second time range different from the first time range, and the image generator generates image data for displaying in chronological order, on the display, the first magnified image and the second magnified image for each of the image group.

8. The image processor according to claim 1, wherein the image generator generates the image data for displaying, on the display, an image in which the first magnified image is overlapped on the first microscope image and the second magnified image is overlapped on the second microscope image.

9. The image processor according to claim 1, further comprising:
   an image associating unit configured to associate the first microscope image with the second microscope image.

10. The image processor according to claim 9, wherein the accepting unit accepts a designation of a plurality of positions in the first microscope image and a plurality of positions in the second microscope image for association, and the image associating unit associates the plurality of positions in the first microscope image with the plurality of positions in the second microscope image.

11. The image processor according to claim 9, wherein the image associating unit associates a pattern included in the first microscope image with a pattern included in the second microscope image.

12. The image processor according to claim 9, wherein the image associating unit associates a pattern included in the first magnified image with a pattern included in the second magnified image.

13. The image processor according to claim 9, wherein a size, an orientation and a position of a specimen image of the first microscope image correspond to a size, an orientation and a position of a specimen image of the second microscope image, respectively.

14. The image processor according to claim 1, wherein the accepting unit accepts an instruction for moving the first magnified image, and
the image generator generates image data for displaying, on the display, a first magnified image in accordance with movement of the first region in the at least part of the first microscope image based on the instruction for moving, and a second magnified image related to the movement of the first region in the at least part of the first microscope image.

15. The image processor according to claim 1, wherein the image generator generates image data for displaying, on the display, a first magnified image in accordance with movement of the first region in the at least part of the first microscope image along a preset scanning path, and a second magnified image related to the movement of the first region in the at least part of the first microscope image.

16. The image processor according to claim 1, further comprising:
a processing accepting unit configured to accept an input of a display condition of the first magnified image, wherein
the image generator generates image data for displaying, on the display, an image being performed image processing regarding the display condition accepted by the processing accepting unit with respect to the first magnified image, and an image being performed image processing corresponding to the image processing performed to the first magnified image with respect to the second magnified image.

17. The image processor according to claim 16, wherein the display condition is at least one of a range magnified by the first magnified image, a magnification of the first magnified image, a brightness of the first magnified image, a contrast of the first magnified image, a rotation of the first magnified image, and a reversal of the first magnified image.

18. The image processor according to claim 1, wherein the image generator generates image data for displaying, on the display, an image by overlapping the first magnified image with the second magnified image.

19. The image processor according to claim 1, wherein the image generator generates image data for displaying, on the display, at least one of an image indicating a position of the first region in the at least part of the first microscope image and an image indicating a position of the second region of the second microscope image related to the first region in the at least part of the first microscope image.

20. The image processor according to claim 19, wherein the accepting unit accepts designation of at least one of the position of the first region in the at least part of the first microscope image which has been displayed and the position of the second region in the at least part of the second microscope image which has been displayed, and
the image generator generates image data for displaying, on the display, a first magnified image and a second magnified image corresponding to the designation of the position.

21. The image processor according to claim 1, wherein for a magnified image which is at least one of the first magnified image and the second magnified image, the image generator generates image data for displaying, on the display, an image being performed image processing for distributing intensity value in the magnified image to an identified intensity range.

22. A microscope system, comprising:
an image processor according to claim 1;
a microscope configured to output a microscope image to the image processor; and
a display configured to display an image based on the image data output from the image processor.

23. The image processor according to claim 1, wherein the image generator generates the image data for displaying, on the display, the first and second microscope images and the first and second magnified microscope images such that the first microscope image and the second microscope image are arranged side by side, and that the first magnified microscope image and the second magnified microscope image are arranged side by side.

24. An image processing method, comprising:
accepting designation in at least part of a first microscope image; and
generating image data for displaying, on a display, a first magnified image in which a first region in the at least part of the first microscope image is magnified based on the designation, a second magnified image in which a second region of a second microscope image related to the first region in the at least part of the first microscope image is magnified, the first microscope image and the second microscope image.

25. The image processing method according to claim 24, wherein
the first microscope image and the second microscope image include images based on mutually different microscopies.

26. The image processing method according to claim 24, wherein
the first microscope image and the second microscope image include images in mutually different focal planes.

27. The image processing method according to claim 24, wherein
the first microscope image and the second microscope image include images including observation objects processed under mutually different processing conditions.

28. The image processing method according to claim 24, wherein
the first microscope image and the second microscope image both include images acquired by a structured illumination microscope, and
the first microscope image and the second microscope image include images generated under mutually different conditions.

29. The image processing method according to claim 24, wherein
the first microscope image and the second microscope image include images captured at mutually different times.

30. The image processing method according to claim 29, wherein
the first microscope image includes an image group of a first time range captured with the lapse of time,
the second microscope image includes an image group of a second time range different from the first time range, and
generating the first magnified image and the second magnified image includes generating image data for displaying, on the display in chronological order, the first magnified image and the second magnified image for each of the image group.

31. The image processing method according to claim 24, wherein
generating the first magnified image and the second magnified image includes generating the image data for displaying, on the display, an image in which the first magnified image is overlapped on the first microscope image and the second magnified image is overlapped on the second microscope image.

32. The image processing method according to claim 24, further comprising:
associating the first microscope image with the second microscope image.

33. The image processing method according to claim 32, wherein
accepting a designation of a plurality of positions in the first microscope image and a plurality of positions in the second microscope image for association, and
associating the first microscope image with the second microscope image includes associating the plurality of positions in the first microscope image with the plurality of positions in the second microscope image.

34. The image processing method according to claim 32, wherein
associating the first microscope image with the second microscope image includes associating a pattern included in the first microscope image with a pattern included in the second microscope image.

35. The image processing method according to claim 34, wherein
a size, an orientation and a position of a specimen image of the first microscope image correspond to a size, an orientation and a position of a specimen image of the second microscope image, respectively.

36. The image processing method according to claim 24, wherein
generating the image data includes generating the image data for displaying, on the display, the first and second microscope images and the first and second magnified microscope images such that the first microscope image and the second microscope image are arranged side by side, and that the first magnified microscope image and the second magnified microscope image are arranged side by side.

37. A non-transitory computer readable medium storing computer program, the computer program causing a computer to perform:
accepting designation in at least part of a first microscope image; and
generating image data for displaying, on a display, a first magnified image in which a first region in the at least part of the first microscope image is magnified based on the designation, a second magnified image in which a second region of a second microscope image related to the first region in the at least part of the first microscope image is magnified, the first microscope image and the second microscope image.

\* \* \* \* \*